US011344860B2

(12) United States Patent
Alshareef et al.

(10) Patent No.: US 11,344,860 B2
(45) Date of Patent: May 31, 2022

(54) MULTIPLE REACTOR SYSTEM FOR PARALLEL CATALYST TESTING

(71) Applicant: Saudi Arabian Oil Company, Dhahran (SA)

(72) Inventors: Ali H. Alshareef, Qatif (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 317 days.

(21) Appl. No.: 16/587,249

(22) Filed: Sep. 30, 2019

(65) Prior Publication Data
US 2021/0094013 A1 Apr. 1, 2021

(51) Int. Cl.
*B01J 19/24* (2006.01)
*B01J 19/00* (2006.01)
*G01N 31/10* (2006.01)

(52) U.S. Cl.
CPC ....... *B01J 19/2425* (2013.01); *B01J 19/0013* (2013.01); *B01J 19/242* (2013.01); *G01N 31/10* (2013.01); *B01J 2219/00092* (2013.01)

(58) Field of Classification Search
CPC .. B01J 19/2425; B01J 19/0013; B01J 19/242; B01J 2219/00092; B01J 2219/00286; B01J 2219/00308; B01J 2219/00353; B01J 2219/00391; B01J 2219/00418; B01J 2219/00495; B01J 2219/00585; B01J 2219/00702; B01J 2219/0072; B01J 2219/00747; B01J 19/0046; G01N 31/10
USPC .......................................................... 436/37
See application file for complete search history.

(56) References Cited

U.S. PATENT DOCUMENTS

| 6,342,185 | B1 | 1/2002 | Dahl et al. |
| 6,368,865 | B1 | 4/2002 | Dahl et al. |
| 6,551,832 | B1 | 4/2003 | Deves et al. |
| 6,901,334 | B2 | 5/2005 | Linsen et al. |

(Continued)

FOREIGN PATENT DOCUMENTS

| CN | 102539618 A | 7/2012 |
| EP | 1273919 A1 | 1/2003 |

(Continued)

OTHER PUBLICATIONS

International Search Report and Written Opinion dated Apr. 7, 2020 pertaining to International application No. PCT/US2019/068243 filed Dec. 23, 2019, 14 pgs.

*Primary Examiner* — Huy Tram Nguyen
(74) *Attorney, Agent, or Firm* — Dinsmore & Shohl LLP

(57) ABSTRACT

A reactor system for conducting multiple continuous reactions in parallel may include a preheating unit that includes an outer preheater shell and a plurality of heating tubes disposed within the preheating shell and arranged in parallel. The reactor system may include a reactor unit downstream of the preheating unit, the reactor unit comprising a plurality of reactor tubes disposed within a reactor shell and an outer heating element disposed about the reactor shell. An inlet end of at least one of the reactor tubes may be fluidly coupled to at least one of the heating tubes of the preheating unit. The reactor unit may include a multi-chamber separator downstream of the reactor unit, the multi-chamber separator having a plurality of separation chambers. At least one of the separation chambers may be fluidly coupled to at least one of the reactor tubes.

19 Claims, 16 Drawing Sheets

(56) References Cited

U.S. PATENT DOCUMENTS

| | | | |
|---|---|---|---|
| 8,592,220 B2 | 11/2013 | Bergh et al. | |
| 2003/0012700 A1 | 1/2003 | Carnahan | |
| 2007/0148062 A1* | 6/2007 | Haas | B01J 19/0046 |
| | | | 518/700 |
| 2011/0113872 A1 | 5/2011 | Dejmek et al. | |

FOREIGN PATENT DOCUMENTS

| | | |
|---|---|---|
| WO | 2005063372 A2 | 7/2005 |
| WO | 2008043313 A1 | 4/2008 |
| WO | 2008080365 A1 | 7/2008 |

\* cited by examiner

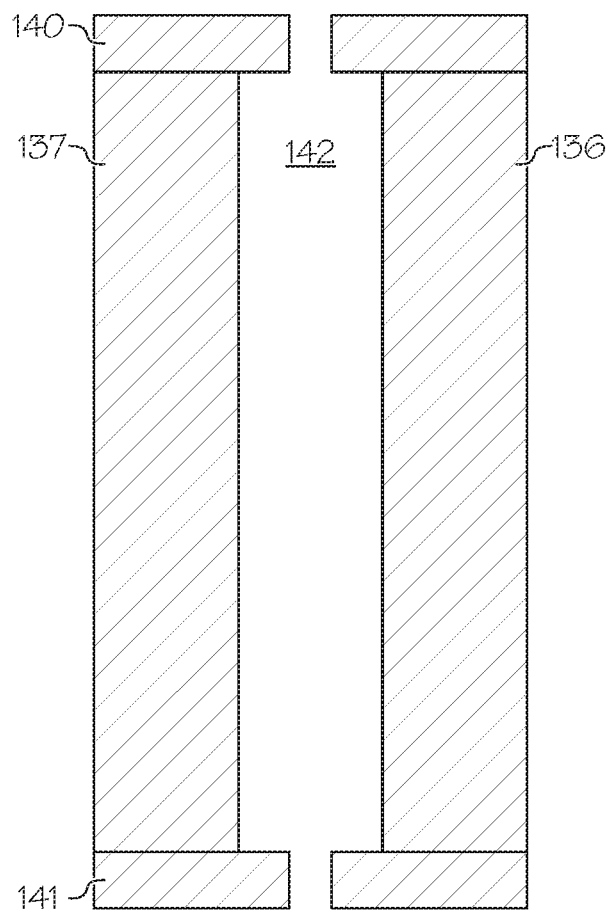
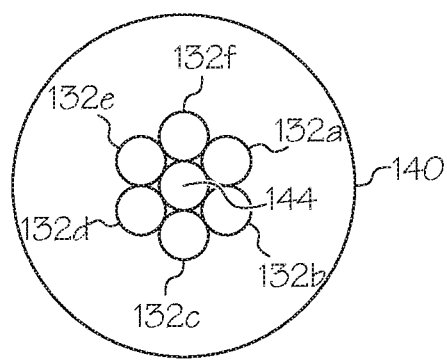
FIG. 8A
FIG. 8B

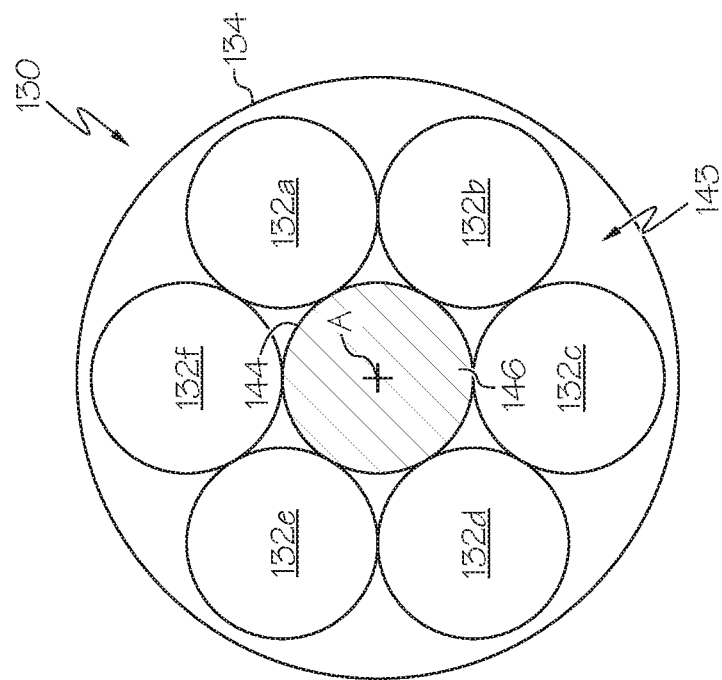
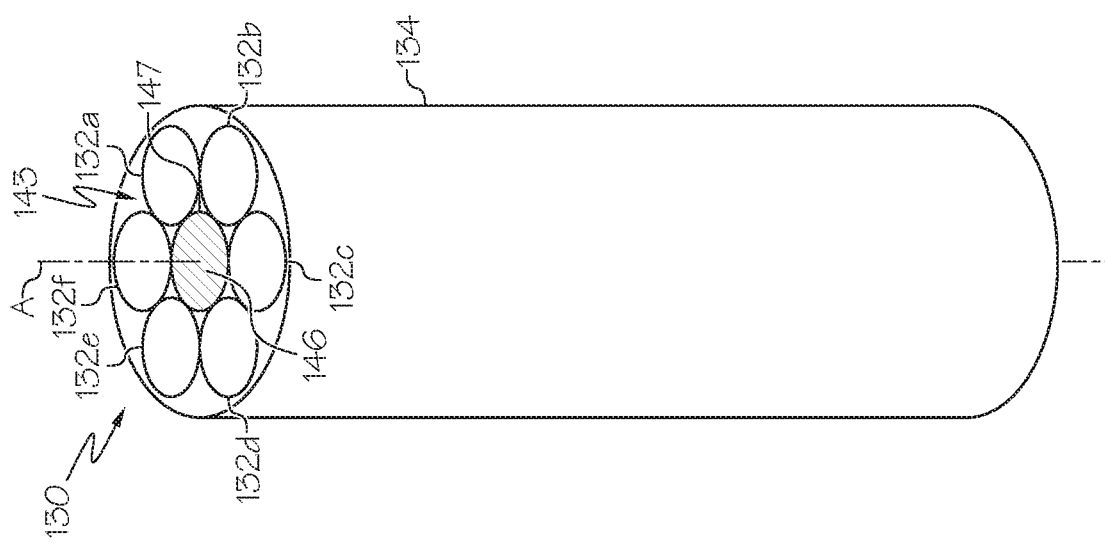

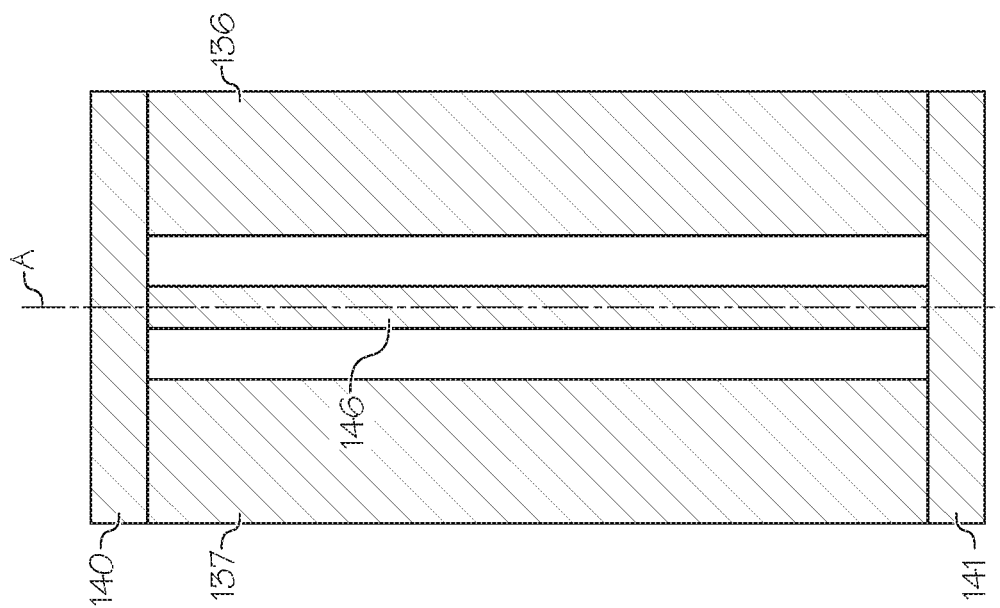
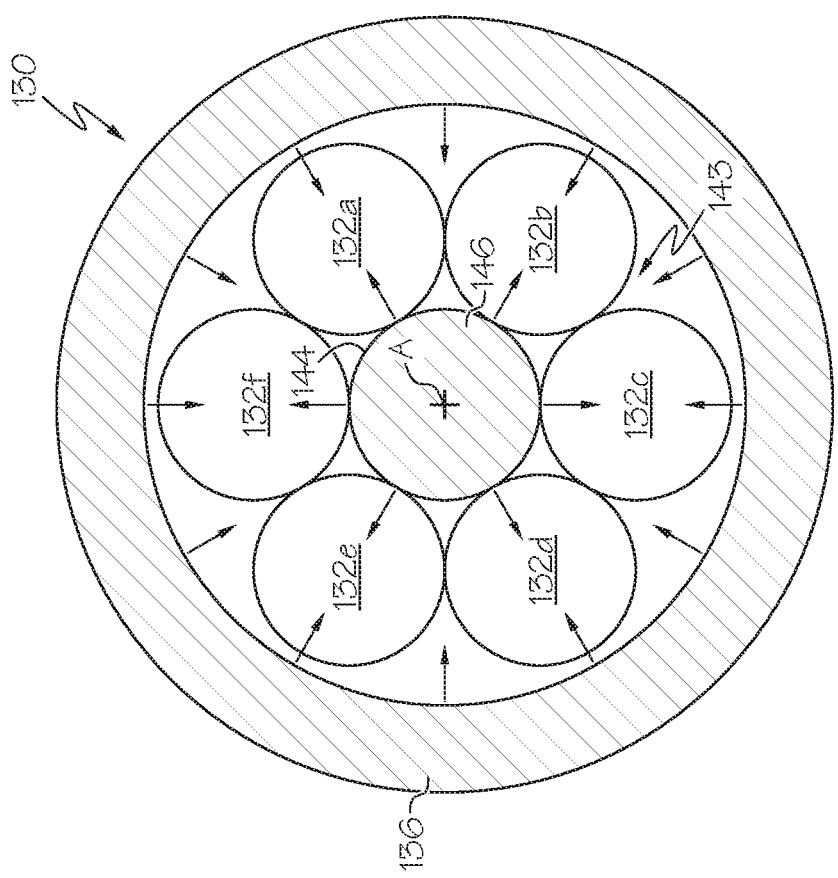
FIG. 10B
FIG. 10A

MULTIPLE REACTOR SYSTEM FOR PARALLEL CATALYST TESTING

BACKGROUND

Field

The present disclosure relates to systems and methods for processing of hydrocarbons and, more specifically, to reactor systems and methods for evaluating catalysts for processing hydrocarbons.

Technical Background

Many processes for converting hydrocarbons to high value products rely on one or a plurality of catalysts for removing contaminants, catalyzing reactions, or other functions. Ongoing research focuses on developing more efficient catalysts for converting hydrocarbons to high value products. For designing catalyst systems and evaluating catalyst performance, small amounts of catalyst are synthesized and then these small amounts of catalyst are evaluated using different reaction conditions or feed compositions to assess their performance. Parallel systems or combinatorial systems have been developed and employed in the industry to assist in initial screening of catalysts at reasonable time frames and costs and have been used for library compounds synthesis or testing.

Typical catalyst testing processes involve a single process line from feeding section, preheating, reaction, cooling, and separation prior to products collection and analysis. In combinatorial systems for initial screening of catalysts, multiple parallel reactors are used that typically have small volume but can achieve multiple catalyst testing simultaneously and quickly using small flow rates and small amounts of catalysts. However, performance in a very small reactor can differ significantly from the performance observed in larger-scale pilot plants and commercial-scale production processes. Pilot plants, with scales that are 10-100 times the scale of typical combinatorial system, but still smaller than commercial scales, give a better picture of the expected performance in commercial-scale processes.

Therefore, after initial development, promising catalysts are typically scaled-up and tested in these larger-scale pilot plant systems. The objective of such scale-up is to approximate the performance that would be observed once the catalyst is in commercial operation. The deviation in performance is due to limited means of controlling reaction conditions and changes in flow dynamics at larger scales. Operators of hydrocarbon processing operations often want to compare different catalysts for performance, whether fresh or spent, at reasonably large scales before selecting a catalyst for a particular process unit and investing further resources in developing or adapting a commercial scale process.

SUMMARY

Typically, larger-scale pilot plant testing of various catalysts is conducted either at the associated operator's research laboratory or technology center or at a third party service provider. The service can require a long time and high costs to evaluate catalysts and rank the catalyst performance. Accordingly, there is an ongoing need for reactor systems and processes for testing multiple catalysts in parallel. The reactor systems and processes described in the present disclosure may be operable to conduct multiple continuous reactions simultaneously, which may enable the parallel evaluation of multiple catalysts at the same time. The reactor systems of the present disclosure may include at least a preheating unit, a reactor unit downstream of the preheating unit, and a multi-chamber separator downstream of the reactor unit. The preheating unit may include an outer preheating shell and a plurality of heating tubes disposed within the preheating shell and arranged in parallel. Each of the heating tubes may be fluidly coupled to a feed system comprising a plurality of feed vessels and a plurality of feed pumps. The reactor unit may include a plurality of reactor tubes disposed within a reactor shell and an outer heating element disposed about the reactor shell. An inlet end of at least one of the reactor tubes may be fluidly coupled to at least one of the heating tubes of the preheating unit. The multi-chamber separator may have a plurality of separation chambers, where at least one of the separation chambers is fluidly coupled to at least one of the reactor tubes. The reactor systems may also include a condenser unit disposed between the reactor unit and the multi-chamber separator, a plurality of liquid collection vessels, a gas collection system, and a gas analyzer to enable further independent processing and evaluating of the reaction effluents from each of the reactor tubes of the reactor unit.

The reactor systems of the present disclosure may enable multiple catalysts to be evaluated simultaneously, which may increase the speed and efficiency of evaluating multiple catalysts at larger-scale. Additionally, the reactor systems may reduce run-to-run variation in operating conditions by simultaneous control of operating conditions in the plurality of parallel reactor tubes, thereby improving the reliability of the testing. The reactor systems of the present disclosure may also provide energy savings in heating and cooling the various process streams during the catalyst evaluations.

According to one or more aspects of the present disclosure, a reactor system for conducting multiple continuous reactions in parallel can include a preheating unit comprising an outer preheater shell and a plurality of heating tubes disposed within the preheating shell and arranged in parallel. The reactor system may further include a reactor unit downstream of the preheating unit. The reactor unit may include a plurality of reactor tubes disposed within a reactor shell and an outer heating element disposed about the reactor shell. An inlet end of at least one of the reactor tubes may be fluidly coupled to at least one of the heating tubes of the preheating unit. The reactor system may further include a multi-chamber separator downstream of the reactor unit. The multi-chamber separator may have a plurality of separation chambers. At least one of the separation chambers may be fluidly coupled to at least one of the reactor tubes.

According to one or more other aspects of the present disclosure, a method for evaluating a plurality of catalysts in parallel may include preheating at least one feed composition in a preheating unit comprising a plurality of heating tubes in parallel to produce at least one heated feed composition and contacting the at least one heated feed composition with a catalyst in at least one reactor tube of a reactor unit to produce at least one reactor effluent. The reactor unit may include a plurality of reactor tubes disposed within a reactor shell and an outer heating element disposed about the reactor shell. An inlet end of at least one of the reactor tubes may be fluidly coupled to at least one of the heating tubes of the preheating unit. The method may further include separating the at least one reactor effluent in a separating chamber of a multi-chamber separator to produce at least one liquid effluent and at least one vapor effluent. The multi-chamber separator may have a plurality of separation chambers, where at least one of the separation chambers may be fluidly coupled to at least one of the reactor tubes.

Additional features and advantages of the technology described in the present disclosure will be set forth in the detailed description that follows, and in part will be readily apparent to those skilled in the art from the description and drawings or recognized by practicing the technology as described in this disclosure, including the detailed description that follows, the claims as well as the appended drawings.

BRIEF DESCRIPTION OF THE DRAWINGS

The following detailed description of specific embodiments of the present disclosure can be best understood when read in conjunction with the following drawings, in which like structure is indicated with like reference numerals and in which:

FIG. 8A schematically depicts a front cross-sectional view of an outer heating element of the reactor unit of FIG. 6 taken along reference line 8A-8A in FIG. 6, according to one or more embodiments shown and described in the present disclosure;

FIG. 8B schematically depicts a top view of the outer heating element of FIG. 8A, according to one or more embodiments shown and described in the present disclosure;

FIG. 9A schematically depicts a front perspective view of a reactor shell and reactor tubes of yet another embodiment of a reactor unit of the reactor system of FIG. 2A, according to one or more embodiments shown and described in the present disclosure;

FIG. 9B schematically depicts a top view of a reactor shell and reactor tubes of the reactor unit of FIG. 9A, according to one or more embodiments shown and described in the present disclosure;

FIG. 10A schematically depicts a transverse cross-sectional view of the reactor unit of FIG. 9A, according to one or more embodiments shown and described in the present disclosure;

FIG. 10B schematically depicts a front cross-sectional view of an outer heating element and central heating element of the reactor unit of FIG. 10A, according to one or more embodiments shown and described in the present disclosure;

Figure 1:
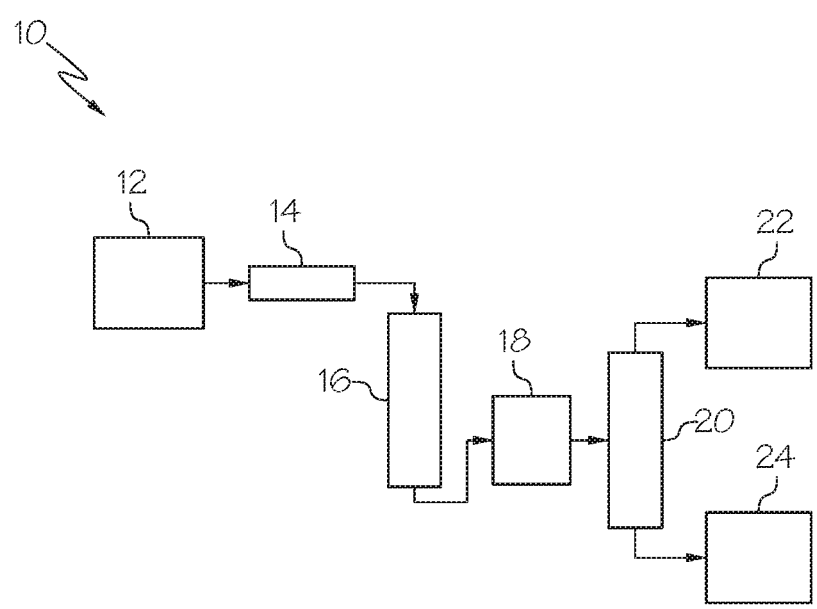
FIG. 1 schematically depicts a process of the prior art for evaluating a single catalyst.

For the purpose of describing the simplified schematic illustrations and descriptions of FIGS. 1-14, the numerous valves, temperature sensors, flow meters, pressure regulators, electronic controllers, pumps, and the like that may be employed and well known to those of ordinary skill in the art of processing hydrocarbons and testing catalysts may not be depicted in the drawings. Though not depicted, it should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2A:
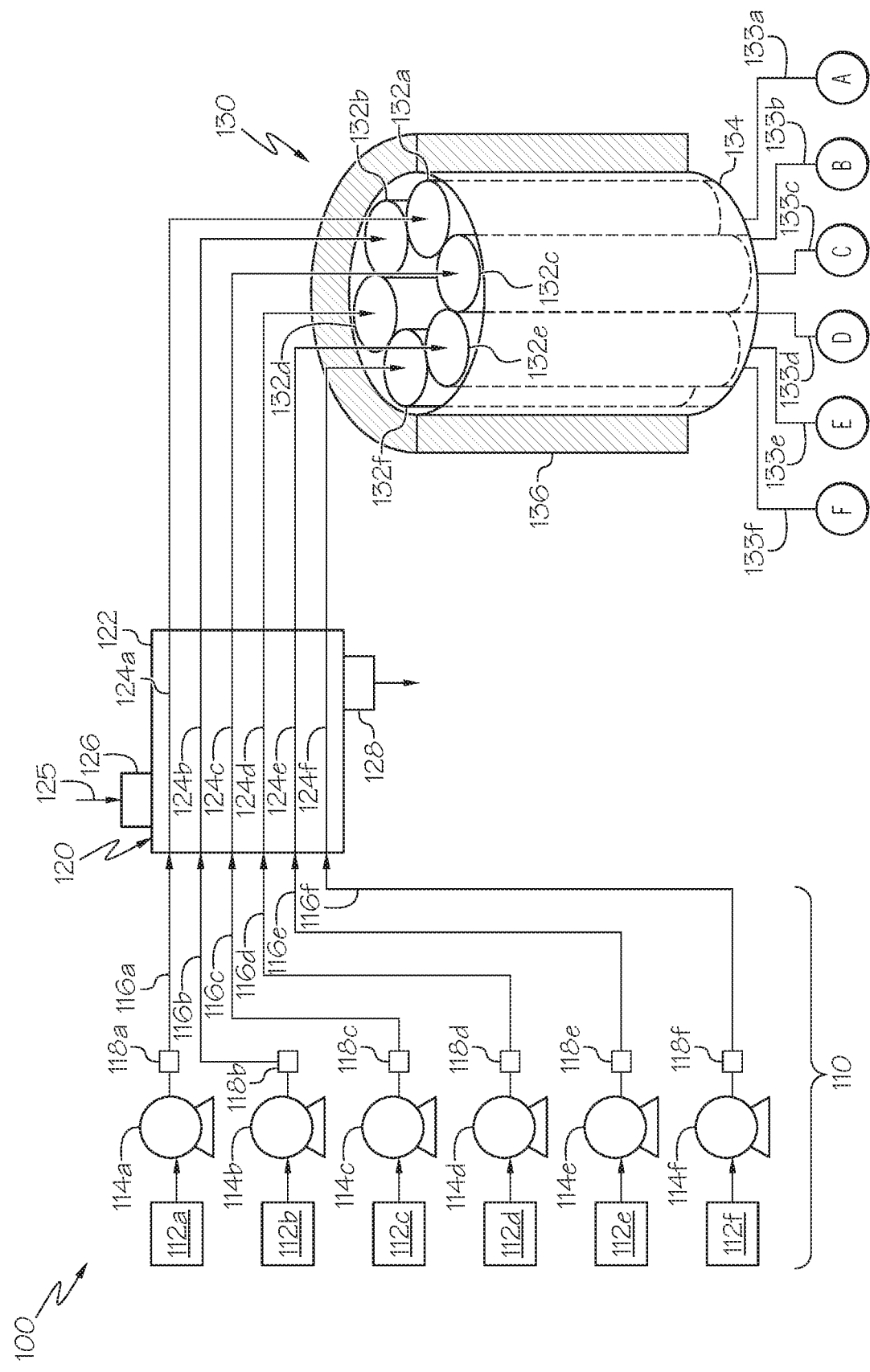
FIG. 2A schematically depicts a first portion of a reactor system for conducting multiple continuous reactions, such as catalytic reactions, simultaneously, according to one or more embodiments shown and described in the present disclosure.
Figure 2B:
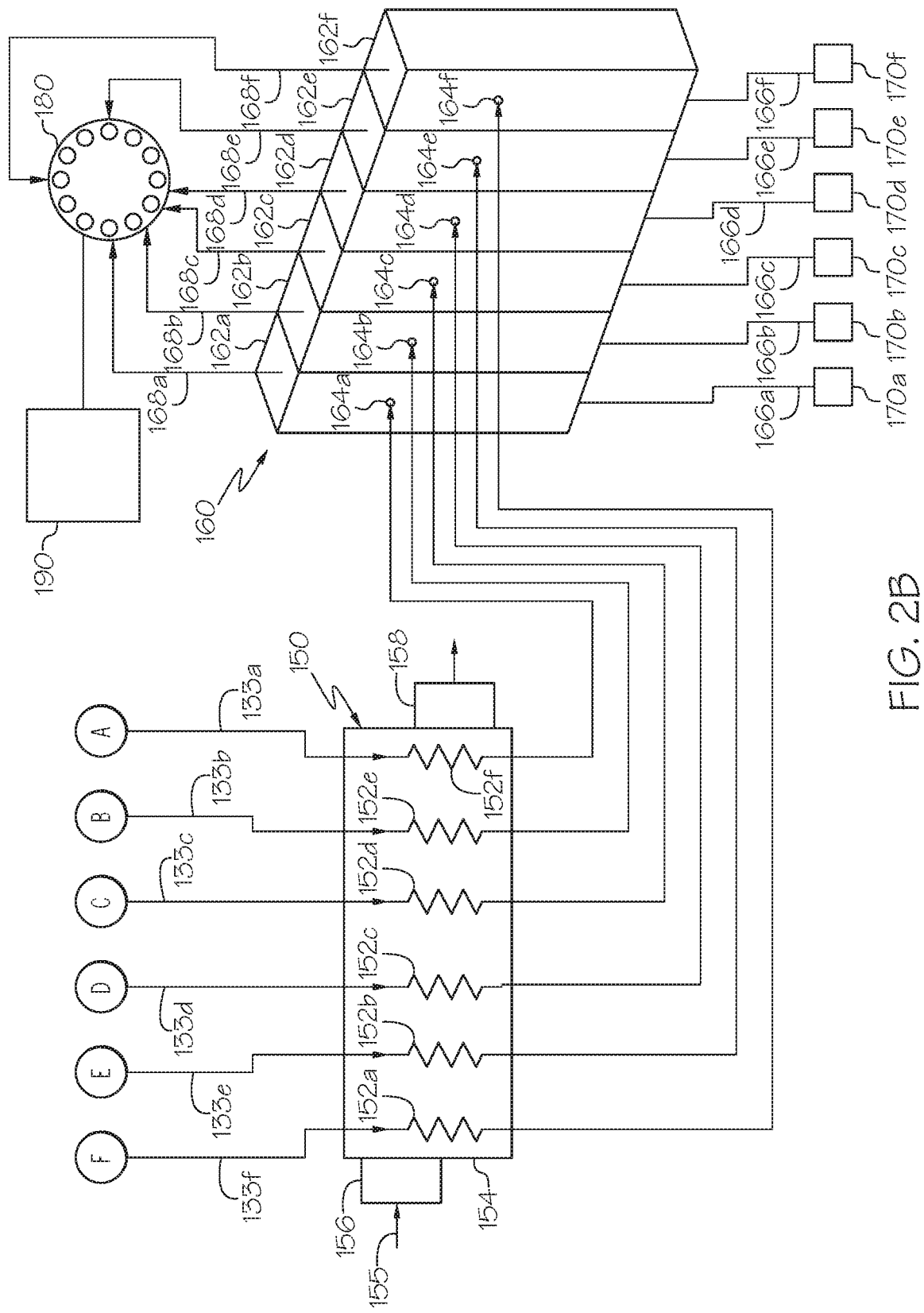
FIG. 2B schematically depicts a second portion of the reactor system for conducting multiple continuous reactions of FIG. 2A, the second portion being a continuation of the reactor system of FIG. 2A, according to one or more embodiments shown and described in the present disclosure.

The present disclosure is directed to reactor systems and methods for conducting multiple continuous reactions simultaneously. Referring to FIGS. 2A and 2B, an embodiment of the reactor systems 100 of the present disclosure is depicted. The reactor systems 100 may include at least a preheating unit 120 having an outer preheating shell 122 and a plurality of heating tubes 124 disposed within the preheating shell 122 and arranged in parallel. The reactor systems 100 further include a reactor unit 130 downstream of the preheating unit 120 and a multi-chamber separator 160 downstream of the reactor unit 130. The reactor unit 130 may include a plurality of reactor tubes 132 disposed within a reactor shell 134 and an outer heating element 136 disposed about the reactor shell 134. An inlet end of at least one of the reactor tubes 132 may be fluidly coupled to at least one of the heating tubes 124 of the preheating unit 120. The multi-chamber separator 160 may include a plurality of separation chambers 162, where at least one of the separation chambers 162 is fluidly coupled to at least one of the reactor tubes 132. The reactor systems 100 may also include a feed system 110 upstream of the preheating unit 120, a condenser 150 disposed between the reactor unit 130 and the multi-chamber separator 160, a liquid collection system 170, a gas collection unit 180, and a gas analyzer 190. The reactor systems 100 of the present disclosure may enable multiple catalyst evaluations to be performed simultaneously, which may improve the efficiency of catalyst evaluation, reduce run-to-run variability in operating conditions, and increase the energy efficiency of catalyst evaluation.

As used throughout the present disclosure, the term "catalyst" may refer to any substance that increases the rate of a particular chemical reaction. Catalysts referred to in the present disclosure may be useful for promoting various reactions, such as but not limited to, fluidized catalytic cracking, hydrocracking, dehydrogenation, dehydrocyclization, isomerization, reforming, or other catalytic reactions.

As used throughout the present disclosure, the terms "upstream" and "downstream" refer to the relative positioning of unit operations with respect to the direction of flow of the process streams. A first unit operation of a system is considered "upstream" of a second unit operation if process streams flowing through the system encounter the first unit operation before encountering the second unit operation. Likewise, a second unit operation is considered "downstream" of the first unit operation if the process streams flowing through the system encounter the first unit operation before encountering the second unit operation.

As used throughout the present disclosure, the term "fluid" may include liquids, gases, or both.

Referring now to FIG. 1, a pilot system 10 of the prior art for evaluating catalyst performance is schematically depicted. The prior art pilot system 10 often includes a single feed system 12, a single preheater 14 downstream of the single feed system 12, a single reactor 16 downstream of the single preheater 14, a condenser 18, a separator 20, a vapor component collection system 22, and a liquid component vessel 24. In operation of the prior art pilot system 10, a single feed composition is passed from the single feed system 12 to the single preheater 14, which heats the single feed prior to the reactor. The heated single feed is then passed from the single preheater 14 to the single reactor 16, in which the single feed may be contacted with the catalyst. Contact may cause a chemical reaction that converts at least a portion of the single feed to other compounds. The effluent from the single reactor 16 may then be passed to the condenser 18 and separator 20 to separate the effluent into liquid components and vapor components. The vapor components may be collected in the vapor component collection system 22, and the liquid components may be collected in the liquid component vessel 24. The vapor components and liquid components may then be analyzed for composition to evaluate the performance of the catalyst.

The systems 10 of the prior art may be capable of evaluating only a single catalyst at a time. Conducting catalyst evaluations by testing one catalyst at a time can be time consuming and may subject the testing to run-to-run variations in the operating conditions, which can lead to difficulties in comparing the performance of various catalysts. Smaller scale systems may reduce the time needed to evaluate multiple catalysts. However, the smaller size of these smaller systems may yield performance data that does not correlate with the performance of the catalyst in commercial scale processes.

Referring to FIGS. 2A and 2B, the reactor systems 100 and processes of the present disclosure may provide multiple parallel reactor pathways that may enable multiple catalysts or thermal reactions to be evaluated simultaneously. As previously discussed, the reactor system 100 may include a feed system 110 having multiple feed vessels 112a-112f, a preheating unit 120 having a plurality of heating tubes 124a-124f, a reactor unit 130 having a plurality of reactor tubes 132a-132f downstream of the preheating unit 120, and a multi-chamber separator 160 downstream of the reactor unit 130. The reactor system 100 may also have a condenser 150 disposed between the reactor unit 130 and the multi-chamber separator 160, a liquid collection system 170, a vapor collection unit 180, and a vapor analyzer 190. The reactor systems 100 of the present disclosure may enable multiple catalysts to be evaluated simultaneously, which may increase the speed and efficiency of evaluating multiple catalysts at larger-scale. Additionally, the reactor systems 100 of the present disclosure may reduce run-to-run variation in operating conditions by simultaneous control of operating conditions in the plurality of parallel reactor tubes 132, thereby improving the reliability of the testing. The reactor systems 100 of the present disclosure may also provide energy savings in heating and cooling the various process streams during the evaluation.

Referring now to FIG. 2A, the reactor system 100 may include the feed system 110, which may include a plurality of feed vessels 112a-112f and a plurality of feed pumps 114a-114f. For simplicity, the feed vessels 112a-112f and feed pumps 114a-114f will be referred to in the present disclosure with reference numbers 112 and 114, respectively. Each of the plurality of feed vessels 112 may be fluidly coupled to one of the plurality of heating tubes 124 of the preheating unit 120. Each of the feed pumps 114 may be operable to transport a feed composition from one of the feed vessels 112 to the associated heating tube 124, which is fluidly coupled to the feed vessel 112. Each feed pump 114 may be disposed between one of the feed vessels 112 and the heating tube 124 fluidly coupled to the feed vessel 112. The feed system 110 may have 2, 3, 4, 5, 6, 7, or more than 7 feed vessels 112 and feed pumps 114. Although shown in FIG. 2A as having 6 feed vessels 112 and six feed pumps 114, it is understood that the feed system 110 may have greater than or less than six feed vessels 112 and feed pumps 114. In some embodiments, the feed system 110 may include a number of feed vessels 112 and feed pumps 114 that may be equal to a total number of reactor tubes 132 of the reactor unit 130. In some embodiments, the feed system 110 may include a number of feed vessels 112 and feed pumps 114 that is a multiple of the number of reactor tubes 132 of the reactor unit 112, which may enable a plurality of separate feed components to be mixed together to form the feed composition.

In some embodiments, the feed system 110 may further include a plurality of pressure control devices 118, each of which may be fluidly coupled to one of the feed vessels 112 or to one of the feed lines 116 fluidly coupling each of the feed vessels 112 with the heating tubes 124 of the preheating unit 120. The pressure control devices 118 may be operable to control a pressure of the feed composition transported from the feed vessel 112 into the corresponding heating tube 124. The pressure control devices 118 may include, but is not limited to, a pressure regulator, or other device capable of controlling the pressure of the feed composition. The plurality of feed vessels 112, feed pumps 114, and pressure control devices 118 may enable the pressure and flow rate of the feed composition to each of the reactor tubes 132 to be varied independently. Depending on the testing objectives, each of the reactor tubes 132 can be run at same flow rate and pressure with different catalysts, can be run with the same catalyst at different flow rates and pressures in each of the reactor tube 132, or can be run with a combination of these configurations.

The feed system 110 may be adaptable to different configurations to accommodate a variety of feed scenarios for the reactions conducted. For example, in some embodiments, the feed system 110 may be configured to produce a single feed composition and distribute the single feed composition to each of the heating tubes 124 of the preheating unit 120. In these embodiments, a single feed vessel 112 and a single feed pump 114 may be fluidly coupled to all of the plurality of heating tubes 124 of the preheating unit 120. In other embodiments, the feed system 110 may include a plurality of feed vessels 112, each having a different reactant or reagent, and the feed lines 116 from each of the plurality of feed vessels 112 may merge upstream of the preheating unit 120 to form a combined feed composition. The combined feed composition may then be distributed to all or a portion of the heating tubes 124 of the preheating unit 120. In some embodiments, the feed system 110 may include a gas inlet (not shown) for each of the feed lines 116 upstream of the preheating unit 120, the gas inlets enabling introduction of a gaseous component into the feed composition upstream of the preheating unit 120. In some embodiments, the feed system 110 may include a plurality of feed vessels 112 fluidly coupled to each one of the feed lines 116, which may enable two or more reactants or streams to be mixed to form the feed composition just prior to introduction into the preheating unit 120. The reactants or streams may be liquid components, vapor components, or a combination of both, and may include primary reactants, diluents, additives, or combinations of these. Other configurations of the feed system 110 are contemplated and would be apparent to one of ordinary skill in the art from practicing the subject matter of the present disclosure.

Referring again to FIG. 2A, the preheating unit 120 may be disposed downstream of the feed system 110. The preheating unit 120 may be disposed between the feed system 110 and the reactor unit 130. The preheating unit 120 may include an outer preheater shell 122 and a plurality of heating tubes 124 disposed within the preheater shell 122. The heating tubes 124 may be arranged in parallel within the preheater shell 122. In some embodiments, each of the heating tubes 124 may be fluidly coupled to one of the feed vessels 112 of the feed system 110. In other embodiments, all or a portion of the heating tubes 124 may be fluidly coupled to a single one of the feed vessels 112. At least one of the heating tubes 124 may have an outlet fluidly coupled to one of the reactor tubes 132 of the reactor unit 130. In some embodiments, each of the heating tubes 124 may be fluidly coupled to a separate one of the plurality of reactor tubes 132. In other embodiments, only a portion of the heating tubes 124 are fluidly coupled to separate ones of the plurality of reactor tubes 132. The preheating unit 110 may have 1, 2, 3, 4, 5, 6, 7, or more than 7 heating tubes 124. In some embodiments, the preheating unit 110 may have a number of heating tubes 124 equal to the number of reactor tubes 132 in the reactor unit 130. In some embodiments, the preheating unit 120 may include a number of heating tubes 124 equal to a multiple of the number of reactor tubes 132 of the reactor unit.

The preheating unit 120 may be operable to heat the feed composition to a temperature greater than or equal to 250 degrees Celsius (° C.), such as greater than or equal to 275° C., or even greater than or equal to 300° C. The preheating unit 120 may be operable to heat the feed composition from 0° C. to 250° C., from 0° C. to 275° C., from 0° C. to 300° C., from 0° C. to 500° C., from 25° C. to 250° C., from 25° C. to 275° C., from 25° C. to 300° C., or even from 25° C. to 500° C. The preheating unit 120 may include an electrical heater, heat transfer medium, or both. In some embodiments, the preheating unit 120 may include one or a plurality of electrical heaters (not shown), such as an electrical resistance heater, positioned to supply heat to the heating tubes 124 disposed within the preheater shell 122. In some embodiments, the electrical heaters may be disposed around an outer surface of the preheater shell 122. Additionally or alternatively, in some embodiments, the preheating unit 120 may include a heat transfer medium filled into the void spaces in the preheater shell 122 and between each of heating tubes 124. The heat transfer medium may improve the heat transfer from the electric heaters to the heating tubes 124. Not intending to be bound by any particular theory, it is believed that the heat transfer medium may increase conduction of heat from the electrical heater to the heating tubes. The heat transfer medium may include, but is not limited to, a molten salt, heated water, supercritical water, fluidized sand, heated oil or solvents, or combinations of these.

Referring to FIG. 2A, in some embodiments, the preheating unit 120 may be a shell- and tube heat exchanger, in which a heat transfer fluid 125 is passed into the preheater shell 122 through heat transfer fluid inlet 126. The heat transfer fluid 125 may pass through the preheater shell 122 and may be operable to transfer heat to the heating tubes 124 within the preheater shell 122. The heat transfer fluid 125 may then be passed out of the preheater shell 122 through heat transfer fluid outlet 128. The heat transfer fluid passed out of the preheater shell 122 may be further heated and recycled back to the heat transfer fluid inlet 126. The heat transfer fluid 125 may include, but is not limited to a molten salt, heated water, supercritical water, fluidized sand, heated oil or solvents, or combinations of these.

Referring again to FIG. 2A, the heated feed composition may pass from the preheating unit 120 to the reactor unit 130 in a plurality of heated feed composition streams. The reactor unit 120 may include the plurality of reactor tubes 132 disposed within the reactor shell 134 and an outer heating element 136 disposed about the exterior surfaces of the reactor shell 134. The reactor tubes 120 may be cylindrical tubes extending along parallel paths through the reactor shell 134. The reactor unit 130 may include 2, 3, 4, 5, 6, 7, or more than 7 reactor tubes 132. At least some of the reactor tubes 132 may include a catalyst. The reactor tubes 132 may be operable to contact one or more reactants in the feed composition with the catalyst to produce one or more product compounds. The reactor effluents 133 may be passed out of the reactor tubes 132 following contact with the catalyst. In some embodiments, all of the reactor tubes 132 may include a catalyst. The catalyst in each of the reactor tubes 132 may be the same or different from the catalysts in each of the other reactor tubes 132.

The catalyst may be held in place in each of the reactor tubes 132 using inert packing materials disposed upstream and downstream of the catalyst. The inert packing material may include, but is not limited to, silicon carbide (SiC) of different sizes, ceramic balls, glass balls, other inert packing materials, or combinations of packing materials. Additionally, glass wool may be added at the inlet and the outlet of the reactor tube 132 as a plug. In some embodiments, the reactor tubes 132 may include a plurality of inert packing materials. For example, in some embodiments, the reactor tubes 132 may include ceramic or glass balls disposed after the glass wool and before the SiC materials so that the packing order is glass wool-ceramic balls-SiC-catalyst-SiC-ceramic balls-glass wool. In some embodiments, the inert packing materials may be alternated with the catalyst to simulate two or more catalyst beds in series. The catalyst in each of the different catalyst beds may be the same or different. For larger reactor tubes 130, the reactor tubes 132 may include welded or free-standing mesh wire screens for maintaining the catalyst and inert packing materials within the reactor tube 132.

The catalyst may be any catalyst operable to increase the reaction rate of reactions for converting hydrocarbons. In some embodiments, one or more than one of the reactor tubes 132 may not include a catalyst. In these embodiments, the reactor tube 132 may be operable to conduct a thermal conversion process that is not catalyzed by a catalyst.

The reactor tubes 132 may have a diameter and length sufficient to provide contact between the catalyst and the feed composition. In some embodiments, the reactor tubes 132 may be have a pilot-scale diameter and length, which may be sufficient to more closely model the performance in a commercial-scale operation compared to a lab or bench scale reactor system. The reactor tubes 132 may have an inner diameter less than the inner diameter of the reactor shell 134. In some embodiments, the reactor tubes 132 may have an inside diameter of greater than or equal to 0.25 centimeters (cm), greater than or equal to 0.5 cm, greater than or equal to 0.75 cm, or even greater than or equal to 1.0 cm. In some embodiments, the reactor tubes 132 may have an inside diameter of less than or equal to 5.0 cm, less than or equal to 4.0 cm, less than or equal to 3.0 cm, or even less than or equal to 2.5 cm. In some embodiments, the reactor tubes 132 may have an inside diameter of from 0.25 cm to 5.0 cm, from 0.25 cm to 4.0 cm, from 0.25 cm to 3.0 cm, from 0.25 cm to 2.5 cm, from 0.5 cm to 5.0 cm, from 0.5 cm to 4.0 cm, from 0.5 cm to 3.0 cm, from 0.5 cm to 2.5 cm, from 0.75 cm to 5.0 cm, from 0.75 cm to 4.0 cm, from 0.75 cm to 3.0 cm, from 0.75 cm to 2.5 cm, from 1.0 cm to 5.0 cm, from 1.0 cm to 4.0 cm, from 1.0 cm to 3.0 cm, from 1.0 cm to 2.5 cm, or from 0.25 cm to 1.0 cm. The reactor tubes 132 may have a length of greater than or equal to 25 cm, greater than or equal to 40 cm, greater than or equal to 50 cm, or even greater than or equal to 75 cm. The reactor tubes 132 may have a length of less than or equal to 150 cm, less than or equal to 125 cm, or even less than or equal to 115 cm. In some embodiments, the reactor tubes 132 may have a length of from 25 cm to 150 cm, from 25 cm to 125 cm, from 25 cm to 115 cm, from 40 cm to 150 cm, from 40 cm to 125 cm, from 40 cm to 115 cm, from 50 cm to 150 cm, from 50 cm to 125 cm, from 50 cm to 115 cm, from 75 cm to 150 cm, from 75 cm to 125 cm, from 75 cm to 115 cm, or even from 25 cm to 75 cm. Each of the reactor tubes 132 may additionally include a thermowell (not shown) within the interior volume of the reactor tubes 132. The thermowells may be configured to receive a thermocouple that may be operable to measure the actual temperature within the reactor tube 132 during the reaction.

Figure 3:
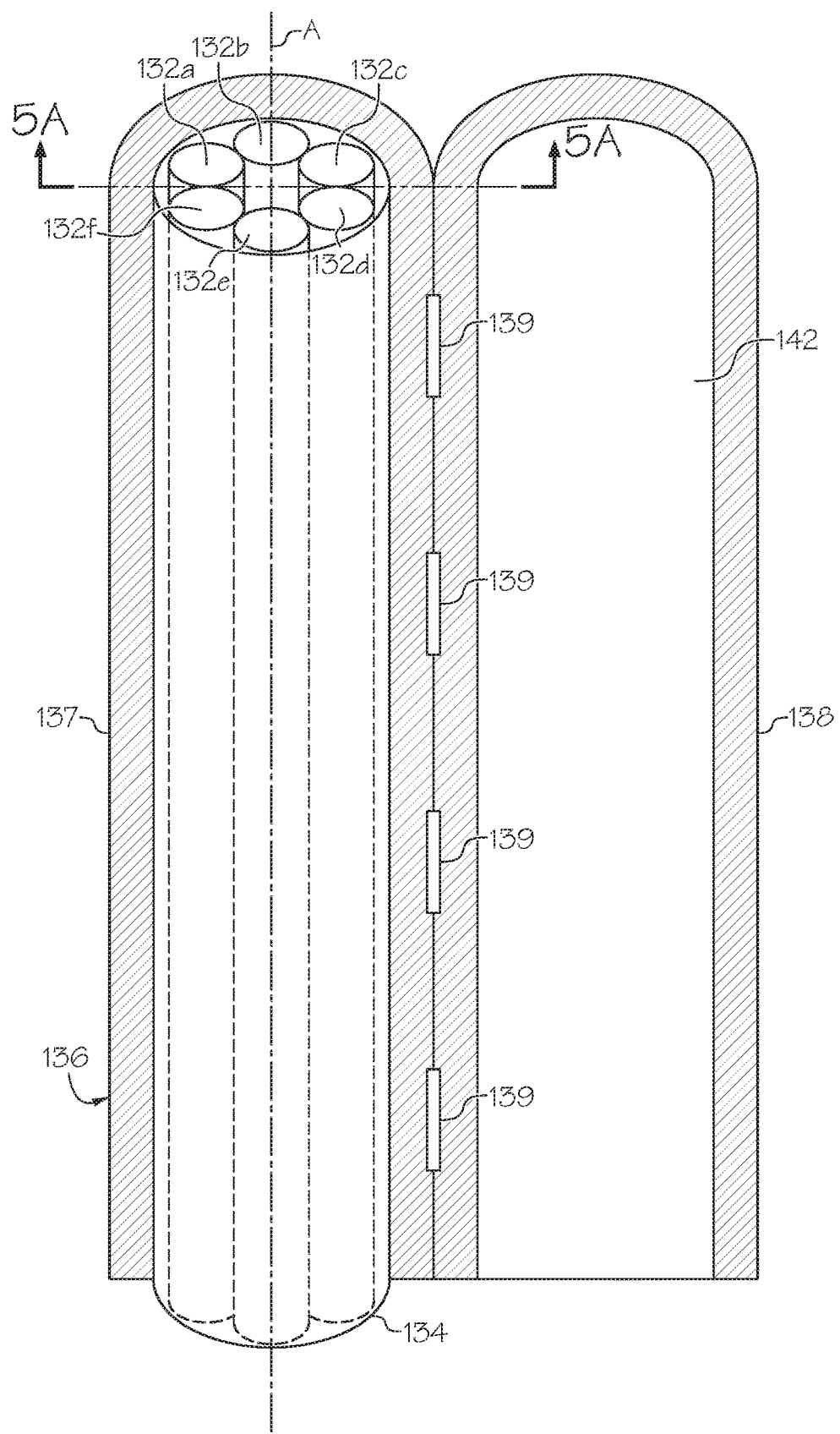
FIG. 3 schematically depicts a front view of a reactor unit of the reactor system of FIG. 2A, according to one or more embodiments shown and described in the present disclosure.
Figures 4A, 4B:
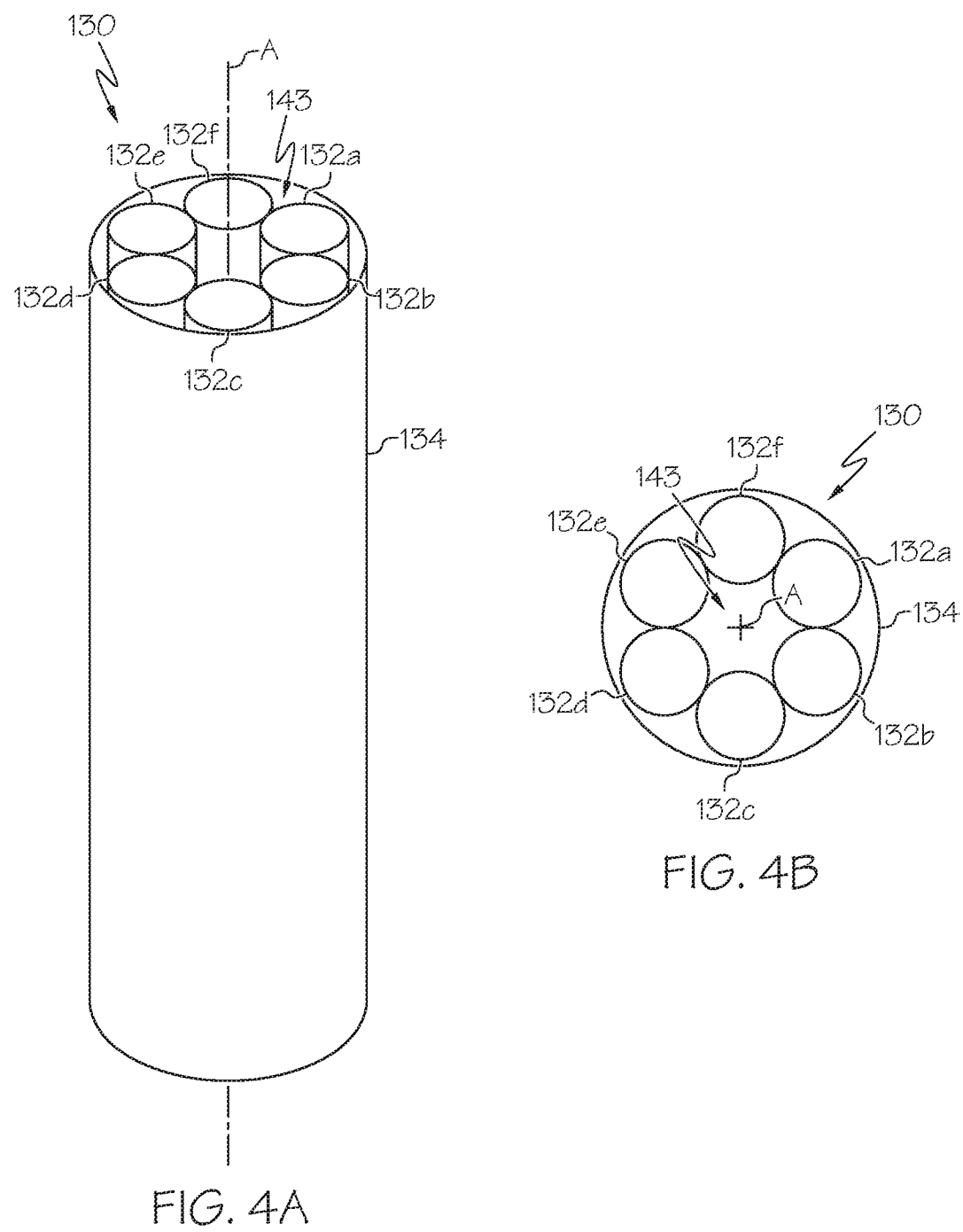
FIG. 4A schematically depicts a front perspective view of a reactor shell and reactor tubes of the reactor unit of FIG. 3, according to one or more embodiments shown and described in the present disclosure.
FIG. 4B schematically depicts a top view of the reactor shell and reactor tubes of FIG. 4A, according to one or more embodiments shown and described in the present disclosure.

Referring now to FIG. 3, the reactor tubes 132 may be arranged within the reactor shell 134 in parallel and aligned with a longitudinal axis A of the reactor shell 134. Referring to FIGS. 4A and 4B, with respect to the transverse arrangement, the reactor tubes 132 may be arranged in an annular pattern within the reactor shell 134. In some embodiments, the reactor shell 134 may be a hollow cylindrical tube and each of the reactor tubes 132 may include a cylindrical tube disposed within and surrounded by the reactor shell 134. Each of reactor tubes 132 may have an inner diameter less than an inner diameter of the reactor shell 134. The reactor unit 130 may include void spaces 143 within the reactor shell 134 and between the reactor tubes 132.

Referring to FIG. 3, the reactor shell 134 may be disposed within the outer heating element 136 such that the outer heating element 136 may completely surround the reactor shell 134. The outer heating element 136 may be operable to direct heat into the reactor shell 134 and into the reactor tubes 132 disposed within the reactor shell 134. The outer heating element 136 may be an electrical heating element. The outer heating element 136 may be in contact with an outer surface of the reactor shell 134. Heat from the outer heating element 136 may be conducted through the reactor shell 134 and then transported through conduction or convection to the reactor tubes 132.

In some embodiments, the outer heating element 136 may be a monolithic cylinder concentric with the reactor shell 134. The outer heating element 136 may have an interior surface that defines a cavity 142 shaped to receive the reactor shell 134. The reactor shell 134 may be inserted into the outer heating element 136 from either end of the outer heating element 136. Alternatively, in some embodiments, which the outer heating element 136 may include a first section 137 and a second section 138 that may combine together to define the cavity 142. The first section 137 and the second section 138 may be separable to open the cavity 142 to provide access to the reactor shell 134 and reactor tubes 132 disposed within the cavity 142 of the outer heating element 136. The outer heating element 136 may further include one or more hinges 139 coupling the first section 137 and the second section 138. The hinges 139 may be operable to enable the first section 137 and the second section 138 to pivot relative to one another so that the outer heating element 136 may be opened to access the reactor shell 134.

Figure 5A:
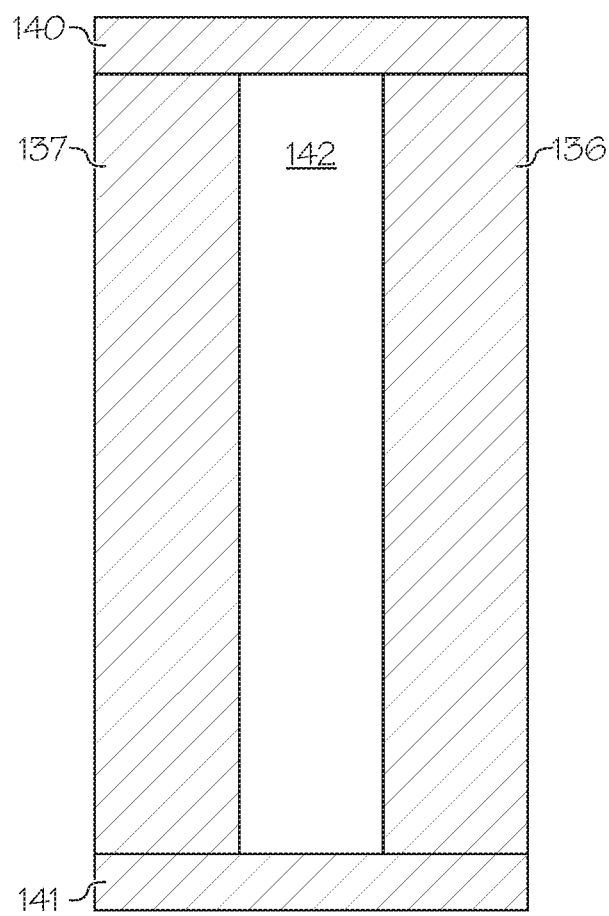
FIG. 5A schematically depicts a front cross-sectional view of an outer heating element of the reactor unit of FIG. 3 taken along reference line 5A-5A in FIG. 3, according to one or more embodiments shown and described in the present disclosure.
Figure 5B:
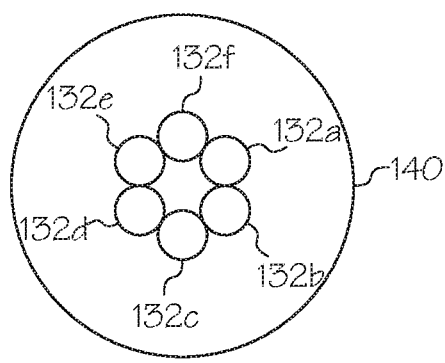
FIG. 5B schematically depicts a top view of the outer heating element of FIG. 5A, according to one or more embodiments shown and described in the present disclosure.

Referring to FIG. 5A, the outer heating element 136 may include a top plate 140 and a bottom plate 141, which may be operable to fully enclose the reactor shell 134 and reactor tubes 132 within the outer heating element 136. The top plate 140 and bottom plate 141 may be operable to reduce heat loss from the reactor shell 134 by limiting heat transfer from the top and bottom of the reactor unit 130. In some embodiments, the top plate 140 and the bottom plate 141 may be actively heated. In other embodiments, the top plate 140 and the bottom plate 141 may be insulating and may not have active heating. FIG. 5B schematically depicts a top view of the top plate 140. As shown in FIG. 5B, the top plate 140 may have a plurality of boreholes extending through the top plate 140, which may provide access to the inlet end of the reactor tubes 132. Although not depicted, the bottom plate 141 may also include a plurality of boreholes extending through the bottom plate 141. The boreholes in the bottom plate 141 may provide access to the outlet ends of the reactor tubes 132. The boreholes in the top plate 140 and bottom plate 141 may provide access to the inlet and the outlet ends of the reactor tubes 132 so that the feed composition may be introduced to the reactor tubes 132 at the inlet ends and the reactor effluents can be withdrawn from the reactor tubes 132 from the outlet ends.

Referring again to FIG. 4A, in some embodiments, the reactor tubes 132 may be arranged in an annular pattern proximate an inner surface of the reactor shell 134 and the center of the reactor shell 134 may be part of the void spaces 143 in the reactor shell 134. In other words, the central portion of the reactor shell 134 along the center axis A may not have a reactor tube 132 and may be void space 143. In this configuration, each of the reactor tubes 132 may be an equal distance from the outer heating element 136 and may each receive an equivalent amount of heat from the outer heating element 136. The even distribution of heat to all of the reactor tubes 132 within the reactor shell 134 may enable the temperature to be maintained constant across all of the reactor tubes 132, which may reduce or prevent run-to-run variations in operating temperature between the reactions simultaneously conducted in the reactor tubes 132.

The void spaces 143 may include a heat transfer material. The heat transfer material in the void spaces 143 may be operable to improve the efficiency of heat transfer from the outer heating element 136 to the reactor tubes 132. The heat transfer material may be a liquid or fluidized solid that is capable of withstanding the temperatures at which the reactions in the reactor tubes 132 are conducted. The heat transfer material may include, but is not limited to, molten salt, high-temperature high-pressure water, supercritical water, fluidized sand, other heat transfer material, or combinations of heat transfer materials. High-temperature high-pressure water may refer to water maintained at a temperature of the reactor tubes 132 and a pressure at which the water is a liquid, gas, or supercritical phase at the reaction temperature of the reactor tubes 132. Molten salts may include any salt having a melting point less than the reaction temperatures in the reactor tubes 132. Molten salts may include, but are not limited to, molten potassium hydroxide, molten sodium hydroxide, other molten salts or combinations of salts.

Figure 6:
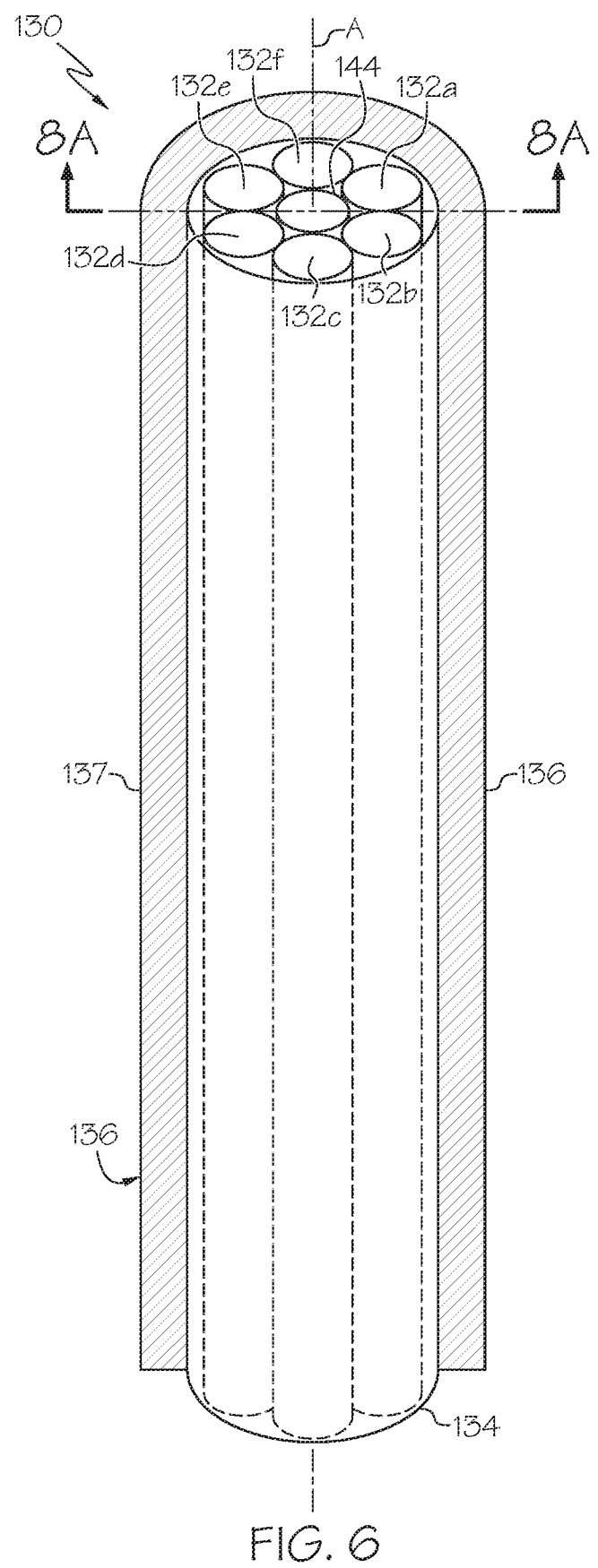
FIG. 6 schematically depicts a front view of another embodiment of a reactor unit of the reactor system of FIG. 2A, according to one or more embodiments shown and described in the present disclosure.
Figure 7A:
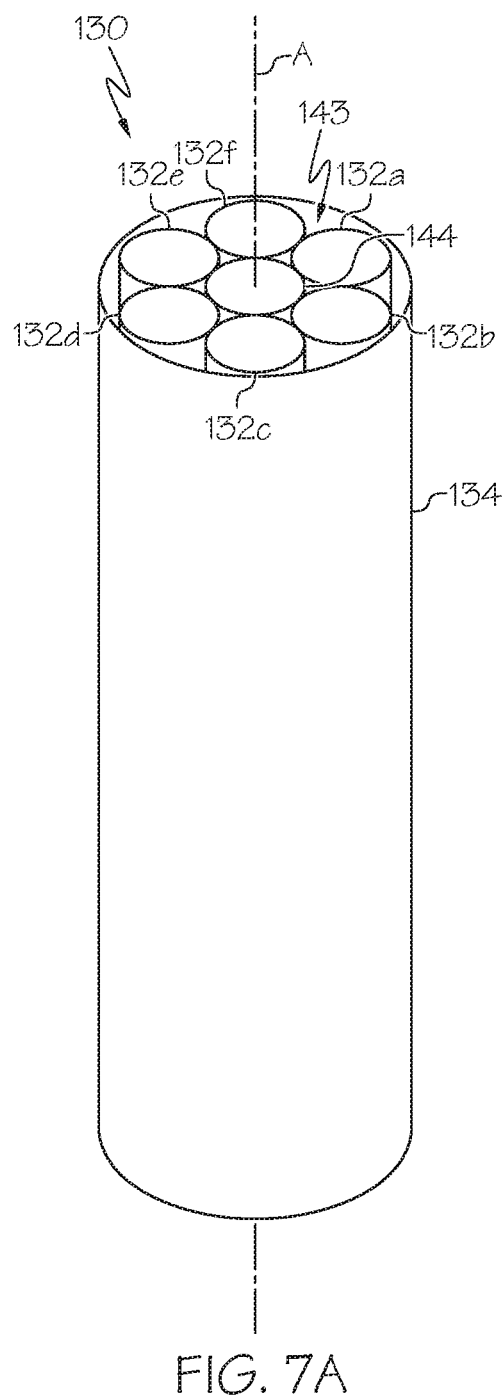
FIG. 7A schematically depicts a front perspective view of a reactor shell and reactor tubes of the reactor unit of FIG. 6, according to one or more embodiments shown and described in the present disclosure.
Figure 7B:
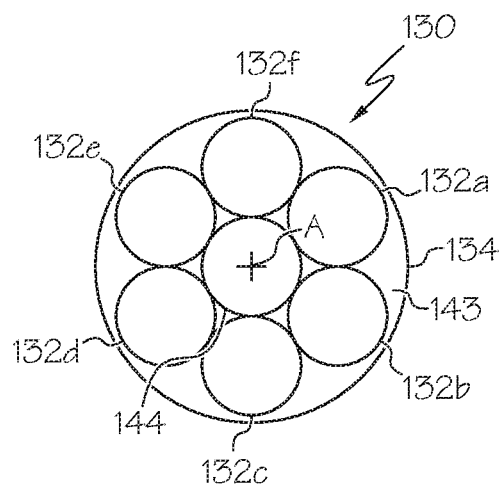
FIG. 7B schematically depicts a top view of the reactor shell and reactor tubes of FIG. 7A, according to one or more embodiments shown and described in the present disclosure.

Referring now to FIG. 6, the reactor unit 130 may include a central tube 144 disposed within the reactor shell 134. The central tube 144 may be concentric with the reactor shell 134. The central tube 144 may be parallel to and centered about center axis A of the reactor shell 134. The central tube 144 may have an inner diameter, length, or both, that are the same or different from the reactor tubes 132. Referring to FIGS. 7A and 7B, the reactor tubes 132 may be arranged in an annular pattern in the annular space defined between the central tube 144 and the reactor shell 134. In some embodiments, the central tube 144 may be empty or may contain a heat transfer material. In other embodiments, the central tube 144 may be an additional reaction tube having an inlet fluidly coupled to one of the plurality of heating tubes 124 of the preheating unit 120 or to an outlet of one of the other reactor tubes 132. When the central tube 144 is a reactor tube, the central tube 144 may have the same inner diameter and length as the other reactor tubes 132. Referring to FIGS. 8A and 8B, when the central tube 144 is a reactor tube, the top plate 140 and bottom plate 141 of the outer heating element 136 may include a central borehole to allow for access to the inlet end and the outlet end of the central tube 144.

Referring now to FIGS. 9A and 9B, in some embodiments, the reactor unit 130 may include a central heating element 146 disposed in the center portion of the reactor shell 134. The central heating element 146 may be operable to supply heat in a direction outward from the central portion of the reactor shell 134 outward to the reactor tubes 132 disposed between the central heating element 146 and the reactor shell 134. The central heating element 146 may be disposed within the central tube 144. Positioning the central heating element 146 inside the central tube 144 may isolate the central heating element 146 from heat transfer materials disposed in the void spaces 143 of the reactor shell 134. The central heating element 146 may be an electric heating element.

Referring now to FIG. 10A, in operation of the reactor unit 130, heat may be supplied from the outer heating element 136 in a direction inward toward the reactor tubes 132 and may also be supplied from the central heating element 146 in a direction outward toward the reactor tubes 132. Heat flow is shown by the arrows in FIG. 10A directed inward from the outer heating element 136 and outward from the central heating element 146. The combination of the outer heating element 136 and the central heating element 146 may provide more even heating to the reactor tubes 132. In particular, the central heating element 146 may provide heat to the portions of the reaction tube facing inward, which may reduce or prevent temperature gradients across the diameter of the reactor tubes 132. Thus, the combination of the outer heating element 136 and the central heating element 146 may be operable to provide more consistent heating of the entire cross section of the reactor tubes 132.

Figure 10C:
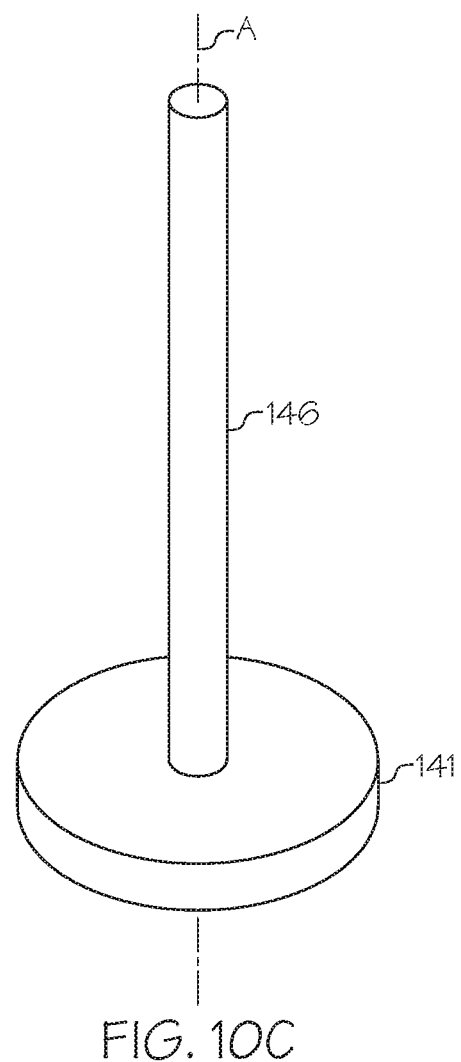
FIG. 10C schematically depicts a perspective view of the central heating element of FIG. 10A, according to one or more embodiments shown and described in the present disclosure.
Figure 11:
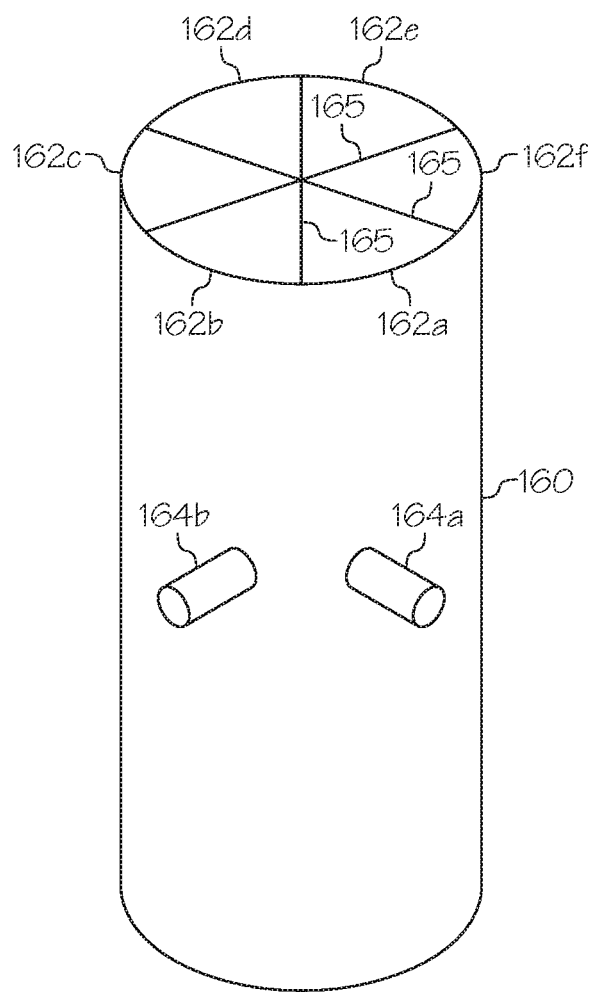
FIG. 11 schematically depicts a perspective view of a portion of a multi-chamber separator of the reactor system of FIGS. 2A and 2B, according to one or more embodiments shown and described in the present disclosure.

Referring to FIG. 10B, the central heating element 146 may extend from the top plate 140 to the bottom plate 141 of the outer heating element 136. The central heating element 146 may be parallel to and centered about the central axis A of the reactor shell 134. Referring now to FIG. 10C, in some embodiments, the central heating element 146 may be mechanically coupled to the bottom plate 141 of the outer heating element 136. The central heating element 146 may be inserted up into the central tube 144 or into the void space 143 in the central portion of the reactor shell 134 prior to commencing the reactions.

In one or more embodiments, the reactor unit 130 may include a monolithic block, and each of the plurality of reactor tubes 132 may be a borehole extending longitudinally through the monolithic block. The monolithic block may be of any material capable of withstanding high reaction temperatures of up to 1000° C. The monolithic block may be a material that is chemically inert at the reaction temperatures of up to 1000° C. In some embodiments, the monolithic block may be a monolithic metal block or a monolithic ceramic block.

Referring now to FIG. 2B, the reactor system 100 of FIG. 2A is continued. The second portion of the reactor system 100 is shown on a separate page for purposes of clarity. It is understood that the reactor system 100 is represented by the combination of FIGS. 2A and 2B. As shown in FIG. 2A, the reactor effluents 133 may be passed out of the reaction zones via multiple tubes fluidly coupled to the outlet ends of the reactor tubes 132. As shown in FIG. 2B, each of these reactor effluents 133 may be passed to a condenser 150 disposed between the reactor unit 130 and the multi-chamber separator 160. The condenser 150 may be operable to cool the reactor effluents 133 to condense liquid components of the reactor effluents 133. The condenser 150 may include a plurality of condenser tubes 152. The condenser tubes 152 may be coiled tubes. At least one of the plurality of condenser tubes 152 may be fluidly coupled to at least one of the reactor tubes 132 and to at least one of the separation chambers 162 of the multi-chamber separator 160. In one or more embodiments, each of the condenser tubes 152 may be fluidly coupled to a separate one of the plurality of reactor tubes 132 and a separate one of the separation chambers 162 of the multi-chamber separator 160.

Referring to FIG. 2B, the condenser unit 150 may include condenser shell 154, and each of the plurality of condenser tubes 152 may be disposed within the condenser shell 154. The condenser shell 154 may have a cooling fluid inlet 156 and a cooling fluid outlet 158. A cooling fluid 155 may be passed into the condenser shell 154 through the cooling fluid inlet 156 and passed out of the condenser shell 154 through the cooling fluid outlet 158. The cooling fluid may be operable to remove heat from the reactor effluents 133 flowing through the condenser tubes 152. The removal of heat may cause one or more than one constituent of the reactor effluents 133 to condense from a vapor to a liquid. The cooling fluid may be any commercially available cooling fluid, such as but not limited to, municipal water, groundwater, seawater, organic solvents such as glycols or alcohols, other cooling fluids, or combinations of cooling fluids.

In some embodiments, the condenser unit 150 may include a plurality of condenser shells 154, and each of the condenser shells 154 may include at least one of the plurality of condenser tubes 152 disposed within the condenser shell 154. In some embodiments, each condenser shell 154 may include a separate one of the plurality of condenser tubes 152. When the condenser unit 150 includes a plurality of condenser shells 154, all of the plurality of condenser shells 154 may be fluidly coupled to a single cooling fluid source.

In some embodiments, the reactor system 100 may not include a condenser unit 150. For example, the condenser unit 150 may be optional for certain processes, such as when cooling is not desired before separation in order to prevent condensation of liquid products in the process lines. For certain processes, the condenser unit 150 may be included to provide sufficient cooling before and during the separation phase. In some embodiments, cooling of the reactor effluents 133 may be provided at the separation phase using a cooling jacket on the multi-chamber separator 160, or other cooling means.

Referring again to FIG. 2B, the cooled reactor effluents may be separately passed from the condenser unit 150 to the multi-chamber separator 160. The multi-chamber separator 160 may be a gas-liquid separator that may be operable to separate liquid components and gas components of each of the reactor effluents. The multi-chamber separator 160 may include a plurality of separation chambers 162. The multi-chamber separator 160 may include 2, 3, 4, 5, 6, 7, or more than 7 separation chambers 162. For example, in some embodiments, the multi-chamber separator 160 may include a number of separation chambers 162 that is equal to the number of reactor effluents 133 passed out of the reactor unit 130. In some embodiments, the multi-chamber separator 160 may have a number of separation chambers 162 equal to the number of reactor tubes 132 of the reactor unit 130. Each of the separation chambers 162 may include an inlet 164. The inlet 164 of each of the separation chambers 162 may be positioned in the middle portion of the separation chambers 162. The inlet 164 of each of the separation chambers 162 may be positioned between the top of the separation chamber 162, from which the vapor components are collected, and the bottom of the separation chamber 162, from which the liquid components are collected.

Figure 12:
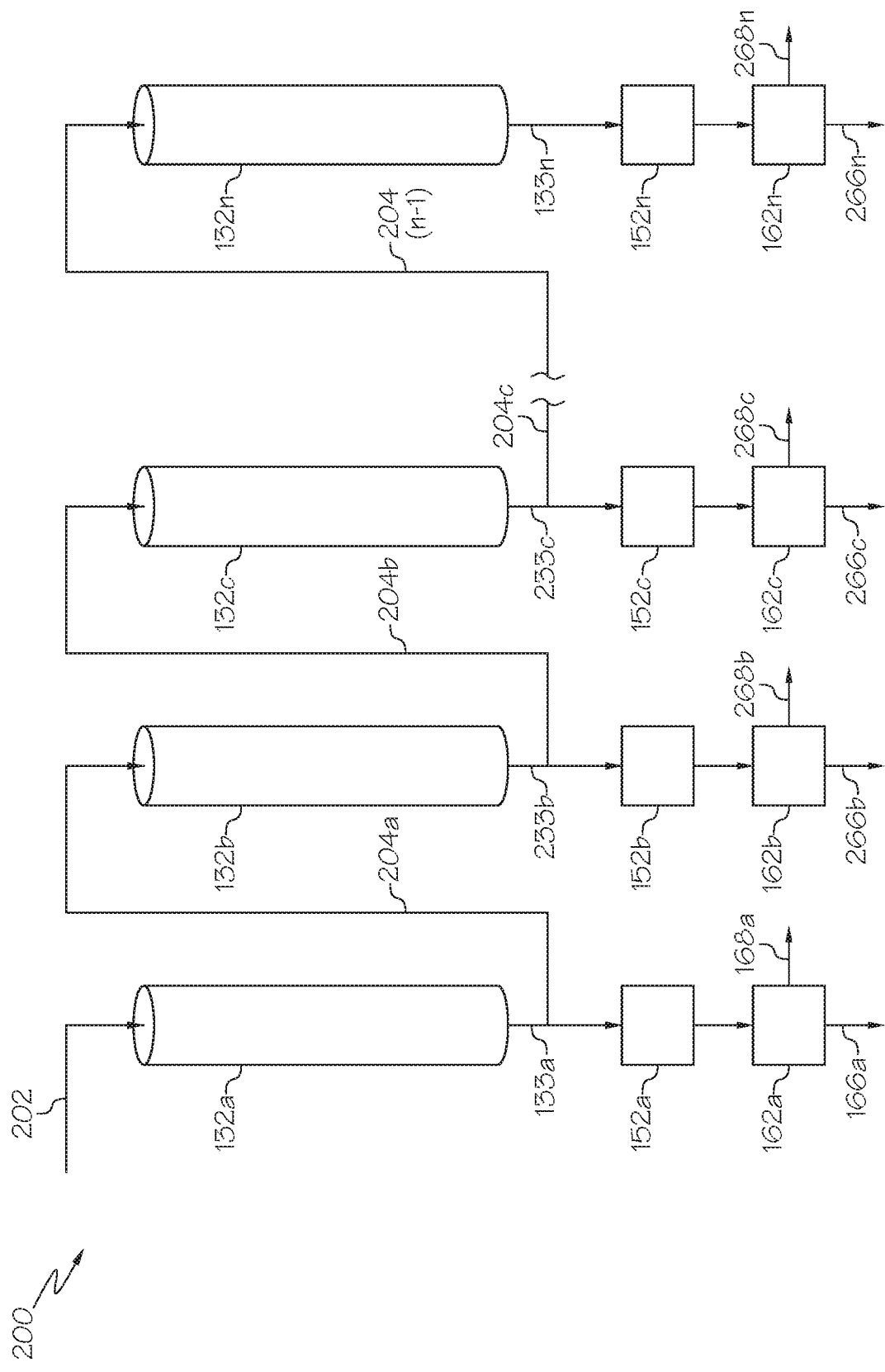
FIG. 12 schematically depicts an alternative configuration of the reactor system of FIGS. 2A and 2B in which the reactor tubes are fluidly coupled in series, according to one or more embodiments shown and described in the present disclosure.
Figure 13:
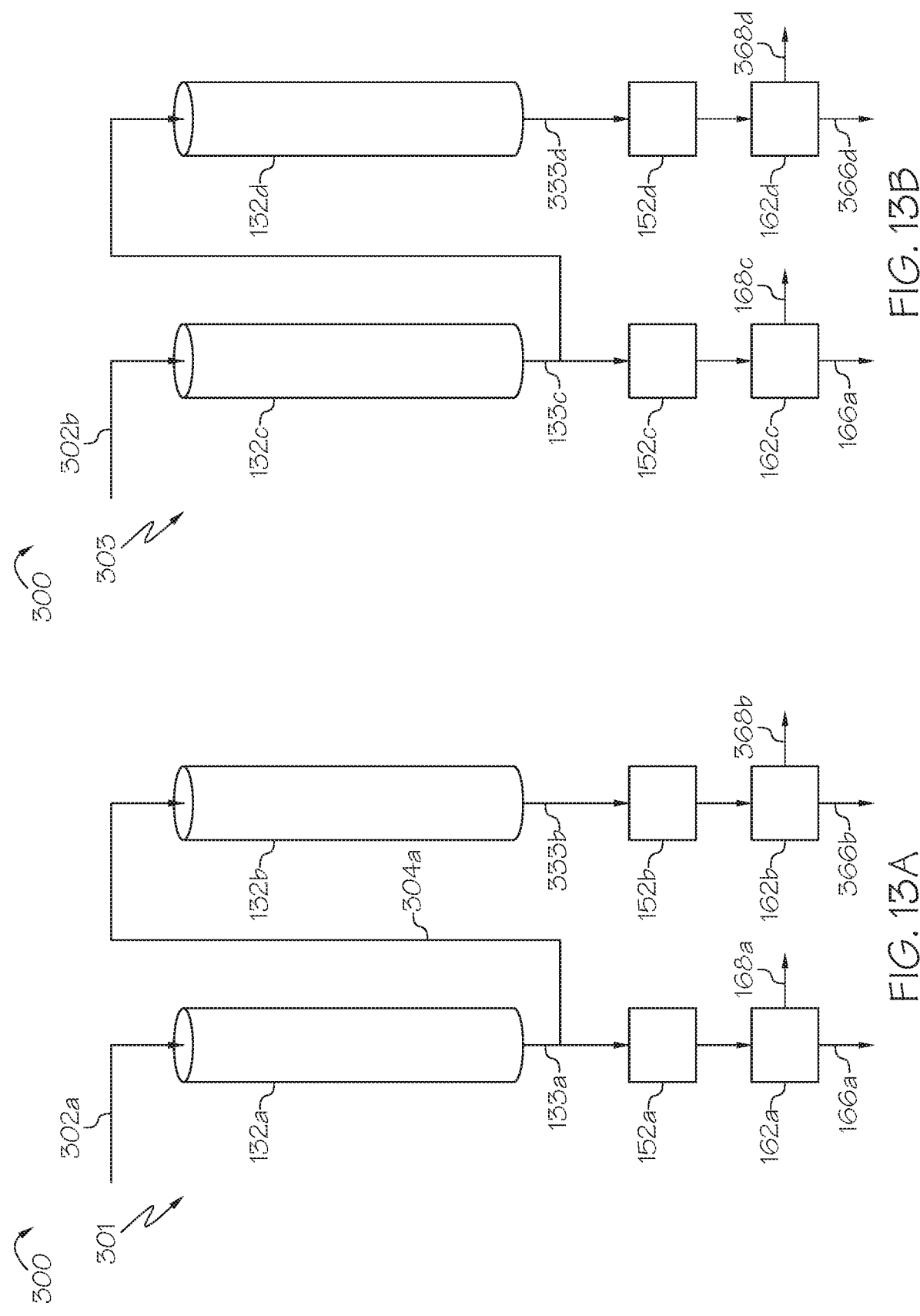
FIG. 13A schematically depicts another alternative configuration of the reactor system of FIGS. 2A and 2B in which the two or more of the reactor tubes are connected in series to form a first subset of reactor tubes, according to one or more embodiments shown and described in the present disclosure.
FIG. 13B schematically depicts two or more other reactor tubes of the reactor system of FIGS. 2A and 2B connected in series to form a second subset of reactor tubes, according to one or more embodiments shown and described in the present disclosure.

The multi-chamber separator 160 is shown in FIG. 2B as having the separation chambers 162 arranged in a side-by-side configuration. However, it is understood that other configurations are possible. For example, referring now to FIG. 11, a perspective cross-sectional view of an embodiment of the multi-chamber separator 160 is depicted. As shown in FIG. 12, the multi-chamber separator 160 may be an oval or cylindrical vessel in which the internal volume is equally divided into the plurality of separation chambers 162 by a plurality of internal walls 165. In some embodiments, the multi-chamber separator 160 may include a steel capsule or oval or cylindrical vessel. Each of the separation chambers 162 may include the inlet 164 in the middle of the separation chamber 162 between the top and bottom of the separation chamber 162. Each of the separation chambers 162 may include a vapor outlet in the topmost portion of the separation chamber 162 and a liquid outlet in the bottommost portion of the separation chamber 162. The separation chambers 162 may also each include level control devices (not shown) to control the liquid level in the separation chamber 62. The separation chambers 162 may also include heat transfer devices, such as but not limited to, cooling jackets and the like, which may be operable to maintain an efficient separation temperature in each of the separation chambers 162, in addition to the cooling provided at the separator or instead of it.

The multi-chamber separator 160 may be jacketed with a cooling jacket to control the multi-chamber separator 160 at a desired separation temperature. The desired separation temperature may be greater than, less than, or equal to the temperature of the condenser unit 150. In some embodiments, the multi-chamber separator 160 may be jacketed into another vessel. In some embodiments, the multi-chamber separator 160 may have a cooling jacket shell. The cooling jacket shell may provide sufficient cooling to the multi-chamber separator 160 to condense components of the reactor effluent without the condenser unit 150. The external tubes conveying the collected liquids or vapors may be heat-traced to prevent gas condensation or liquid solidification.

In some embodiments in which the condenser unit 150 is optional, at least one of the separation chambers 162 of the multi-chamber separator 160 may be fluidly coupled directly to at least one of the plurality of reactor tubes 132. In some embodiments in which the condenser unit 150 is optional, each of the separation chambers 162 may be fluidly coupled directly to one of the reactor tubes 132. In some embodiments, at least one of the separation chambers 162 may be directly fluidly coupled to one of the reactor tubes 132 and at least another one of the separation chambers 162 may be directly fluidly coupled to one of the condenser tubes 152.

Referring again to FIG. 2B, the reactor system 100 may include a plurality of liquid collection systems 170 that may be operable to collect liquid effluents 166 from each separation chamber 162 of the multi-chamber separator 160. Each liquid collection system 170 may be fluidly coupled to one of the plurality of separation chambers 162 of the multi-chamber separator 160. Each liquid collection system 170 may include a pressure let-down device (not shown) and a liquid product vessels disposed downstream of and fluidly coupled to the pressure let-down devices. Each of the liquid product vessels may be vented or may be maintained under an inert atmosphere. Online liquid analyzers can be installed downstream of the pressure let-down devices and either before or after liquid product vessels. The online liquid analyzers may be operable to determine the compositions of the liquid effluents 166 of each of the reactor effluents 133. Additionally or alternatively, liquid effluents 166 may be removed from the liquid product vessels and analyzed using standard analytical methods known in the art to determine compositions.

Referring again to FIG. 2B, the reactor system 100 may include a gas collection unit 180 that may be operable to collect each of the vapor effluents 168 from the separation chambers 162 of the multi-chamber separator 160. The gas collection unit 180 may be fluidly coupled to the vapor outlets of each of the plurality of separation chambers 162 of the multi-chamber separation unit 160. The gas collection unit 180 may include a multi-port valve 182 that may be operable to direct individual ones of the vapor effluents 168 to a gas detection system 190, or to vent as a waste gas. When vented, the vapor effluents may be treated in one or more treatment systems. The gas detection system 190 may include, but is not limited to, a gas chromatograph for example.

Referring again to FIGS. 2A and 2B, in operation of the reactor system 100, one or a plurality of feed compositions may be passed from the feed vessels 112 of the feed system 110 to the heating tubes 124 of the preheating unit 120 via the feed pumps 114 and feed lines 116. The feed system 110 may have any of the configurations, features, or characteristics previously described in this disclosure for the feed system 110. The same feed composition or different feed compositions can be introduced to each of the heating tubes 124. The feed composition may be a liquid, a gas, or a combination of liquid and gas. In some embodiments, the same feed composition may be passed to each heating tube 124. In other embodiments, a different feed composition may be introduced to at least one heating tube 124 of the preheating unit 110.

The reactions in the reactor tubes 132 may be conducted at the same or different flow rate or at the same or different pressure. The flow rate and pressure in the reactor tubes 132 of the reactor unit 130 may be determined by the flow rate and pressure of the feed composition from the feed system 100. The feed compositions may be passed to each of the heating tubes 112 at the same or different flow rates and pressures. The flow rate may dependent on the size of reactor tubes 132 and the capacity of the feed pumps 114. For example, the feed composition may be passed to each of the heating tubes 124 at a liquid flow rate of greater than or equal to 0.25 liters per day (L/day), greater than or equal to 0.5 L/day, or even greater than or equal to 1.0 L/day. The feed composition may be passed to the heating tubes 124 at a liquid flow rate of less than or equal to 75 L/day, less than or equal to 50 L/day, or less than or equal to 20 L/day. In some embodiments, the feed composition may be passed to the heating tubes 124 of the preheating unit 120 at a liquid flow rate of from 0.25 L/day to 75 L/day, from 0.25 L/day to 50 L/day, from 0.25 L/day to 20 L/day, from 0.5 L/day to 75 L/day, from 0.5 L/day to 50 L/day, from 0.5 L/day to 20 L/day, from 1.0 L/day to 75 L/day, from 1.0 L/day to 50 L/day, from 1.0 L/day to 20 L/day, or even from 20 L/day to 75 L/day.

In some embodiments, the feed composition may be a vapor, in which case the feed rate may depend on the type of catalyst and the composition of the feedstock. When the feed composition comprises a vapor component, the feed composition may have a gas flow rate of the vapor components of greater than or equal to 0 (zero) standard liters per hour (SLPH), greater than or equal to 10 SLPH, or even greater than or equal to 20 SLPH. When the feed composition comprises a vapor component, the feed composition may have a gas flow rate of the vapor components of less than or equal to 600 SLPH, less than or equal to 500 SLPH, less than or equal to 300 SLPH, or even less than or equal to 150 SLPH.

Depending on the testing objectives, each reaction in each of the reactor tubes 132 can be all run at the same flow rates and pressure with different catalysts or with same catalyst at different flow rates or pressures in every reactor tube 132. The flow rate in each of the reactor tubes 132 may be increased or decreased by modifying operation of the corresponding feed pump 114. The pressure in each of the reactor tubes 132 may be increased or decreased by manipulating the pressure regulator 118 corresponding to each of the reactor tubes 132.

The feed compositions from the feed system 110 may be passed to the preheating unit 120. The preheating unit 120 may have any of the configurations, features, or characteristics previously described in this disclosure for the preheating unit 120. Each feed composition may be passed through each of the feed tubes 116 and may be passed into each of the corresponding heating tubes 124 fluidly coupled to each of the feed tubes 116. The preheating unit 120 may be operable to transfer heat to the feed compositions passed through the heating tubes 124 to produce a plurality of heated feed compositions. In some embodiments, operation of the reactor system 100 may include passing a heat transfer fluid 125 through the preheater shell 122, where passing the heat transfer fluid 125 through the preheater shell 122 may cause heat from the heat transfer fluid 125 to transfer to the feed composition passing through the heating tubes 124. The flow of heat transfer fluid 125 through the preheater shell 122 may be co-current or counter-current to the flow of feed compositions through the heating tubes 124.

Referring again to FIG. 2A, each of the heated feed compositions may be passed from the heating tubes 124 of the preheating unit 120 to one of the plurality of reactor tubes 132 of the reactor unit 130. The reactor unit 130 may have any of the configurations, features, or characteristics previously described in this disclosure for the reactor unit 130. In each of the reactor tubes 132, the heated feed compositions may be contacted with a catalyst at a reaction temperature. Heat may be transferred to each of the reactor tube 132 from the outer heating unit 136, the central heating unit 146, or both, to maintain the reaction temperature in each of the reactor tubes 132. In some embodiments, one or more of the reactor tubes 132 may not contain a catalyst. In these embodiments, a thermal conversion reaction without a catalyst may be conducted in the reaction tube 132. In some embodiments, the inlet end of each of the plurality of reactor tubes 132 may be fluidly coupled to one of the heating tubes 124 and an outlet end of each of the plurality of reactor tubes 132 may be fluidly coupled to one of the condenser tubes 152 of the condenser 150 or to one of the separation chambers 162 of the multi-chamber separator 160. In this configuration, each of the reactions in the reactor tubes 132 may be conducted in parallel. In some embodiments, one or more of the reactor tubes 132 may be packed with multiple catalyst beds to model a reaction system having multiple catalyst beds in series. In each of the reactor tubes 132, contact of each heated feed composition with the catalyst at the reaction temperature or thermal conversion of a portion of each heated feed composition without a catalyst may cause at least a portion of the heated feed composition to react to produce a reactor effluent 133 having a composition different than the heated feed composition.

Referring to FIGS. 2A and 2B, each of the plurality of reactor effluents 133 may be passed from the reactor unit 130 (FIG. 2A) to the condenser 150 (FIG. 2B) or to the multi-chamber separator 160 (FIG. 2B). For clarity purposes, depiction of the passage of reactor effluents 133 from the reactor unit 130 to the condenser 150 or multi-chamber separator 160 begins in FIG. 2A and continues in FIG. 2B. Whether the reactor effluents 133 are passed to the condenser 150 or directly to the multi-chamber separator 160 may depend on the composition of the reactor effluents 133. In embodiments in which the condenser is employed, each of the reactor effluents 133 may be passed to one of the condenser tubes 152 of the condenser 150. The condenser 150 may have any of the configurations, features, or properties previously described in this disclosure for the condenser 150. Heat may be removed from each of the reactor effluents 133 in the condenser 150 to produce a plurality of lesser temperature reactor effluents. Operation of the condenser 150 may include passing a cooling fluid 155 through the condenser shell 154 from the cooling fluid inlet 156 to the cooling fluid outlet 158. The flow of the cooling fluid 150 through the condenser shell 154 may be co-current or counter-current to the flow of the reactor effluents 133 through the condenser tubes 152.

Referring to FIG. 2B, each of the lesser temperature reactor effluents may be passed from the condenser unit 150 to the multi-chamber separator 160. In some embodiments, the condenser 150 may not be needed, and the reactor effluents 133 may be passed directly from the reactor tubes 132 of the reactor unit 130 to the multi-chamber separator 160. The multi-chamber separator 160 may have any of the configurations, features, or characteristics previously described in this disclosure for the multi-chamber separator 160. Each of the reactor effluents 133 or lesser temperature reactor effluents may be passed to one of the separation chambers 162 of the multi-chamber separator 160 through inlets 164 in each separation chamber 162. Each of the reactor effluents 133 or lesser temperature reactor effluents may be separated into a liquid effluent 166 and a vapor effluent 168 in the separation chamber 162.

Each liquid effluent 166 may be passed from the separation chamber 162 to one of the liquid collection systems 170. Each liquid effluent 166 may be analyzed using an online analyzer. Each of the liquid effluents 166 may also be collected in a liquid collection vessel. Each of the vapor effluents 168 may be passed to the vapor collection unit 180. Each of the vapor effluents 168 may be passed from the vapor collection unit 180 to a gas analyzer 190. The liquid collection systems 170, vapor collection unit 180, and gas analyzer 190 may have any of the configurations, features, or characteristics previously described in this disclosure for the liquid collection systems 170, the vapor collection unit 180, and the gas analyzer 190, respectively.

As shown in FIGS. 2A and 2B, the reactor system 100 may be configured to operate each reactor tube 132 in parallel so that multiple catalyst evaluations may be performed simultaneously. Additionally, the reactor systems of the present disclosure may be configured to operate one or more of the reactor tubes 132 of the reactor unit 130 in series. For example, an inlet end of at least one of the reactor tubes 132 may be fluidly coupled to an outlet of at least another one of the reactor tubes 132. In some embodiments, each of the reactor tubes 132 may be fluidly coupled in series.

Referring to FIG. 12, a reactor system 200 is depicted in which each of the reactor tubes 132 are fluidly connected in series so that the feed composition passes through each of the reactor tubes 132a-132n in series. The feed system 110 may be operable to produce a single feed composition. The single feed composition may be passed through one of the heating tubes 124 of the preheating unit 120 to produce a heated feed composition, as previously described in the present disclosure. The heated feed composition is indicated in FIG. 12 with reference number 202.

The heated feed composition 202 may be passed to a first reactor tube 132a of the reactor unit 130. In the first reactor tube 132a, the heated feed composition 202 may be contacted with a first catalyst to produce a first reactor effluent 133a. A first portion of the first reactor effluent 133a may be passed to a first condenser tube 152a of the condenser unit 150 and then on to a first separation chamber 162a of the multi-chamber separator 160. The first separation chamber 162a may be operable to separate the portion of the first reactor effluent 133a into a first liquid effluent 166a and a first vapor effluent 168a. The first liquid effluent 166a and the first vapor effluent 168a may be analyzed to evaluate the performance of the first reaction tube 132a and the first catalyst disposed in the first reaction tube 132a.

A second portion of the first reactor effluent 133a may be passed on to the second reactor tube 132b as a first feed stream 204a. The first feed stream 204a may be contacted with a second catalyst in the second reactor tube 132b to produce a second reactor effluent 133b. The second catalyst may be the same or different from the first catalyst. A portion of the second reactor effluent 133b may be passed to a second condenser tube 152b of the condenser unit 150 and then on to a second separation chamber 162b of the multi-chamber separator 160. The second separation chamber 162b may be operable to separate the portion of the second reactor effluent 133b into a second liquid effluent 166b and a second vapor effluent 168b. The second liquid effluent 166b and the second vapor effluent 168b may be analyzed to evaluate the performance of the second reaction tube 132b and the second catalyst disposed in the second reaction tube 132b.

A second portion of the second reactor effluent 133b may be passed on to the third reactor tube 132c as a second feed stream 204b. The second feed stream 204b may be contacted with a third catalyst in the third reactor tube 132c to produce a third reactor effluent 133c. The third catalyst may be the same or different from the first catalyst, the second catalyst, or both. A portion of the third reactor effluent 133c may be passed to a third condenser tube 152c of the condenser unit 150 and then on to a third separation chamber 162c of the multi-chamber separator 160. The third separation chamber 162c may be operable to separate the portion of the third reactor effluent 133c into a third liquid effluent 166c and a third vapor effluent 168c. The third liquid effluent 166c and the third vapor effluent 168c may be analyzed to evaluate the performance of the third reaction tube 132c and the third catalyst disposed in the third reaction tube 132c. A second portion of the third reactor effluent 133c may be passed on to a subsequent reactor tube as third feed stream 204c. The process previously described in the preceding paragraph may be repeated for n number of reactor tubes 132n of the reactor unit 130, as shown in FIG. 12. The configuration of the reaction system 200 in FIG. 12 may enable the evaluation of a catalyst for use in a commercial process comprising a plurality of catalyst beds or the evaluation of a catalyst system comprising a plurality of different catalysts in series. The configuration of the reaction system 200 in FIG. 12 may also enable evaluation of catalyst performance as a function of contact time for a specific catalyst by testing the composition of the reactor effluents 133a-133n after each of the reactor tubes 132a-132n.

Referring now to FIGS. 13A and 13B, a reaction system 300 is depicted in which the reactor tubes 132 of the reactor unit 130 are grouped into subsets of reactor tubes 132 fluidly coupled in series, where the subsets of reactor tubes 132 can be operated in parallel. FIG. 13A depicts a first subset 301 of reactor tubes 132, and FIG. 13B depicts a second subset 303 of reactor tubes 132. Although two subsets of reactor tubes 132 are shown in FIGS. 13A and 13B, the reactor system 300 may include more than two subsets of reactor tubes 132 or may include one subset of reactor tubes 132 in combination with a plurality of individual reactor tubes 132 in parallel. Referring to FIG. 13A, the first subset 301 may include the first reaction tube 132a and the second reaction tube 132b fluidly coupled in series. A first feed composition may be prepared in the feed system 110 and passed through one of the heating tubes 124 of the preheating unit 120 to produce a first heated feed composition 302a. The first heated feed composition 302a may be passed to the first reactor tube 132a, in which the first heated feed composition 302a may be contacted with a first catalyst to produce a first reactor effluent 133a. As previously discussed, a first portion of the first reactor effluent 133a may be passed to a first condenser tube 152a of the condenser unit 150 and then on to a first separation chamber 162a of the multi-chamber separator 160. The first separation chamber 162a may be operable to separate the portion of the first reactor effluent 133a into a first liquid effluent 166a and a first vapor effluent 168a. The first liquid effluent 166a and the first vapor effluent 168a may be analyzed to evaluate the performance of the first reaction tube 132a and the first catalyst disposed in the first reaction tube 132a.

A second portion 304a of the first reactor effluent 133a may be passed on to the second reactor tube 132b. The second portion 304a of the first reactor effluent 133a may be contacted with a second catalyst in the second reactor tube 132b to produce a second reactor effluent 133b. The second catalyst may be the same or different from the first catalyst. The second reactor effluent 133b may be passed to a second condenser tube 152b of the condenser unit 150 and then on to a second separation chamber 162b of the multi-chamber separator 160. The second separation chamber 162b may be operable to separate the second reactor effluent 133b into a second liquid effluent 166b and a second vapor effluent 168b. The second liquid effluent 166b and the second vapor effluent 168b may be analyzed to evaluate the performance of the second reaction tube 132b, the second catalyst disposed in the second reaction tube 132b, and the performance of the first subset of reactor tubes overall.

Referring to FIG. 13B, the second subset 303 of reactor tubes 132 may include the third reactor tube 132c and a fourth reactor tube 132d fluidly coupled in series. A second feed composition may be prepared in the feed system 110 and passed through a second one of the heating tubes 124 of the preheating unit 120 to produce a second heated feed composition 302b. The second heated feed composition 302b may be passed to the third reactor tube 132c, in which the second heated feed composition 302b may be contacted with a third catalyst to produce a third reactor effluent 133c. The third catalyst may be the same or different from the first catalyst, the second catalyst, or both. As previously discussed, a first portion of the third reactor effluent 133c may be passed to a third condenser tube 152c of the condenser unit 150 and then on to a third separation chamber 162c of the multi-chamber separator 160. The third separation chamber 162c may be operable to separate the portion of the third reactor effluent 133c into a third liquid effluent 166c and a third vapor effluent 168c. The third liquid effluent 166c and the third vapor effluent 168c may be analyzed to evaluate the performance of the third reaction tube 132c and the third catalyst disposed in the third reaction tube 132c.

A second portion of the third reactor effluent 133c may be passed on to the fourth reactor tube 132d. The second portion of the third reactor effluent 133c may be contacted with a fourth catalyst in the fourth reactor tube 132d to produce a fourth reactor effluent 133d. The fourth catalyst may be the same or different from the first catalyst, the second catalyst, the third catalyst, or combinations of these catalysts. The fourth reactor effluent 133d may be passed to a fourth condenser tube 152d of the condenser unit 150 and then on to a fourth separation chamber 162d of the multi-chamber separator 160. The fourth separation chamber 162d may be operable to separate the fourth reactor effluent 133b into a fourth liquid effluent 166b and a fourth vapor effluent 168d. The fourth liquid effluent 166d and the fourth vapor effluent 168d may be analyzed to evaluate the performance of the fourth reaction tube 132d, the fourth catalyst disposed in the fourth reaction tube 132d, or the performance of the second subset of reactor tubes overall.

The remaining reactor tubes 132, such as a fifth reactor tube 132e through the nth reactor tube 132n, may be grouped into additional subsets of reactor tubes operated individually. Although the first subset of reactor tubes and second subset of reactor tubes are shown in FIGS. 13A and 13B as having two reactor tubes, it is understood that other configurations are possible. For example, in some embodiments, the reactor unit 130 may include subsets of reactor tubes 132 having 2, 3, 4, or more than 4 reactor tubes 132 in each subset. In other words, the reactor unit may include groupings of 1, 2, 3, 4, or more than 4 reactor tubes 132 in which the reactor tubes 132 in each grouping or subset are fluidly coupled in series.

Figure 14:
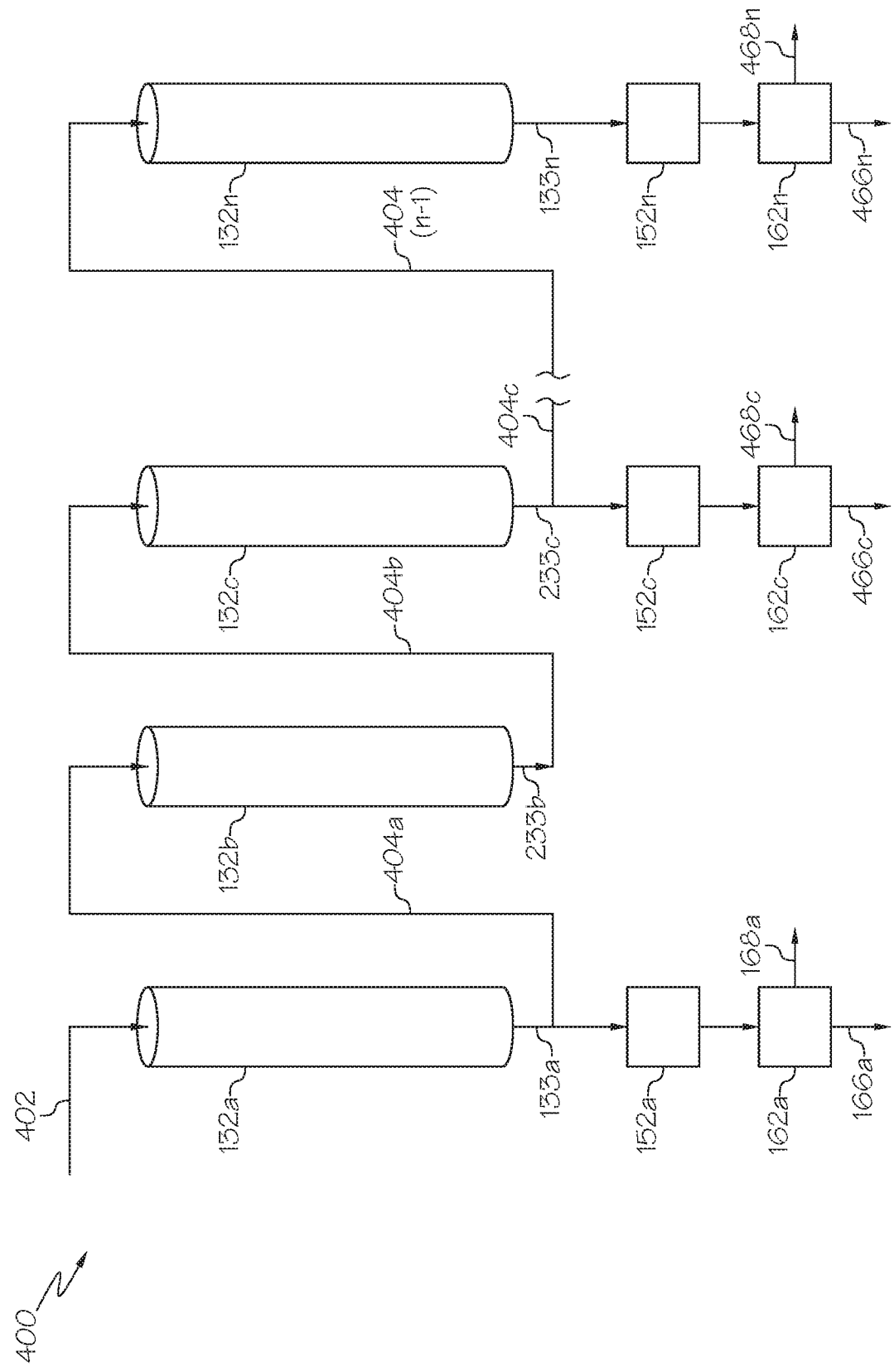
FIG. 14 schematically depicts yet another alternative configuration of the reactor systems of FIGS. 2A and 2B in which all of an effluent from at least one reactor tube in a series arrangement is bypassed around the multi-chamber separator and fed directly to the next reactor tube in the series, according to one or more embodiments shown and described in the present disclosure.

Referring now to FIG. 14, in some embodiments, the reactor tubes 132, such as the first reactor tube 132a through the nth reactor tube 132n, may be fluidly coupled in series as in FIG. 12, but one or more of the reactor effluents 133 may be passed all to the downstream reactor tube 132 without separating a portion and sending it to the condenser unit 150 and multi-chamber separator 160. In FIG. 14, all of the second reactor effluent 233b may be passed from the second reactor tube 132b to the inlet of the third reactor tube 132c. No part of the second reactor effluent 233b is passed to the condenser 150 or the multi-chamber separator 160. Operation of the first reactor tube 132a and the third reactor tube 132c are the same as previously described in relation to FIG. 12.

In a first aspect of the present disclosure, a reactor system for conducting multiple continuous reactions in parallel can include a preheating unit comprising an outer preheater shell and a plurality of heating tubes disposed within the preheating shell and arranged in parallel. The reactor system may further include a reactor unit downstream of the preheating unit. The reactor unit may include a plurality of reactor tubes disposed within a reactor shell and an outer heating element disposed about the reactor shell. An inlet end of at least one of the reactor tubes may be fluidly coupled to at least one of the heating tubes of the preheating unit. The reactor system may further include a multi-chamber separator downstream of the reactor unit. The multi-chamber separator may have a plurality of separation chambers. At least one of the separation chambers may be fluidly coupled to at least one of the reactor tubes.

A second aspect of the present disclosure may include the first aspect, further comprising a feed system that may include a plurality of feed vessels and a plurality of feed pumps. Each of the plurality of feed vessels may be fluidly coupled to one of the plurality of heating tubes, and each of the plurality of feed pumps may be operable to transport a feed composition from one of the plurality of feed vessels to the associated heating tube.

A third aspect of the present disclosure may include the second aspect, in which the feed system may include a plurality of pressure control devices, each of which may be fluidly coupled to one of the feed vessels and may be operable to control a pressure of the feed composition transported from the feed vessel into the heating tube.

A fourth aspect of the present disclosure may include any one of the first through third aspects, in which one or more of the reactor tubes may include a catalyst.

A fifth aspect of the present disclosure may include any one of the first through third aspects, in which one or more of the reactor tubes may not contain a catalyst and may be operable to conduct a thermal conversion process.

A sixth aspect of the present disclosure may include any one of the first through fifth aspects, in which the reactor unit may include the plurality of reactor tubes arranged in an annular pattern within the reactor shell.

A seventh aspect of the present disclosure may include any one of the first through sixth aspects, in which the reactor shell may include a monolithic metal block and each of the plurality of reactor tubes may comprise a borehole extending longitudinally through the monolithic metal block.

An eighth aspect of the present disclosure may include any one of the first through sixth aspects, in which the reactor shell may include a hollow cylindrical tube and each of the reactor tubes may comprise a cylindrical tube disposed within and surrounded by the reactor shell.

A ninth aspect of the present disclosure may include the eighth aspect, in which each of the reactor tubes may have an outer diameter less than an inner diameter of the reactor shell.

A tenth aspect of the present disclosure may include either of the eighth or ninth aspects, in which the reactor unit comprises void spaces between the reactor tubes and within the reactor shell.

An eleventh aspect of the present disclosure may include the tenth aspect, in which the void spaces comprise a heat transfer material.

A twelfth aspect of the present disclosure may include the eleventh aspect, in which the heat transfer material may include one or more of a molten salt, heated water, supercritical water, fluidized sand, or combinations of these.

A thirteenth aspect of the present disclosure may include any one of the first through twelfth aspects, in which the reactor unit may include a central tube disposed within the reactor shell and concentric with the reactor shell.

A fourteenth aspect of the present disclosure may include the thirteenth aspect, in which the reactor tubes may be arranged in an annular pattern between the central tube and the reactor shell.

A fifteenth aspect of the present disclosure may include either one of the thirteenth or fourteenth aspects, in which the central tube may comprise a reactor tube having an inlet fluidly coupled to one of the plurality of heating tubes or an outlet of one of the other reactor tubes.

A sixteenth aspect of the present disclosure may include either one of the thirteenth or fourteenth aspects, in which the reactor unit may comprise a central heating element disposed within the central tube.

A seventeenth aspect of the present disclosure may include the sixteenth aspect, in which the central heating element may be operable to supply heat outward from a center of the reactor shell towards the plurality of reactor tubes arranged between the central heating element and the reactor shell.

An eighteenth aspect of the present disclosure may include either one of the sixteenth or seventeenth aspects, in which the central heating element may be coupled to a bottom plate of the outer heating element.

A nineteenth aspect of the present disclosure may include any one of the sixteenth through eighteenth aspects, in which the central heating element may be an electrical heating element.

A twentieth aspect of the present disclosure may include any one of the first through nineteenth aspects, in which the outer heating element may comprise an electrical heating element.

A twenty-first aspect of the present disclosure may include any one of the first through twentieth aspects, in which the outer heating element may comprise a first section and a second section. The first section and the second section may be separable to provide access to the reactor shell and reactor tubes disposed within the outer heating element.

A twenty-second aspect of the present disclosure may include the twenty-first aspect, in which the outer heating element may further comprise one or more hinges coupling the first section to the second section.

A twenty-third aspect of the present disclosure may include any one of the first through twenty-second aspects, further comprising a condenser unit disposed between the reactor unit and the multi-chamber separator. The condenser may include a plurality of condenser tubes, where at least one of the plurality of condenser tubes may be fluidly coupled to at least one of the reactor tubes and to at least one of the separation chambers of the multi-chamber separator.

A twenty-fourth aspect of the present disclosure may include the twenty-third aspect, in which the condenser unit may include a single condenser shell and each of the plurality of condenser tubes are disposed within the single condenser shell.

A twenty-fifth aspect of the present disclosure may include the twenty-third aspect, in which the condenser unit may include a plurality of condenser shells and each of the condenser shells may include one of the plurality of condenser tubes disposed within the condenser shell.

A twenty-sixth aspect of the present disclosure may include the twenty-fifth aspect, in which all of the plurality of condenser shells may be fluidly coupled to a single cooling fluid source.

A twenty-seventh aspect of the present disclosure may include any one of the first through twenty-sixth aspects, in which an inlet end of at least one of the reactor tubes may be fluidly coupled to an outlet of at least one of the other reactor tubes.

A twenty-eighth aspect of the present disclosure may include any one of the first through twenty-seventh aspects, in which the plurality of reactor tubes may be fluidly coupled in series.

A twenty-ninth aspect of the present disclosure may include any one of the first through twenty-eighth aspects, in which an outlet of at least one of the reactor tubes may be fluidly coupled to an inlet of one of the other reactor tubes and to one of the separation chambers of the multi-chamber separation unit or one of the condenser tubes of the condenser unit.

A thirtieth aspect of the present disclosure may include any one of the first through twenty-eighth aspects, in which an outlet of at least one of the reactor tubes may be fluidly coupled to an inlet of one of the other reactor tubes and may not be fluidly coupled directly to the multi-chamber separation unit or the condenser unit.

A thirty-first aspect of the present disclosure may include any one of the first through twenty-sixth aspects, in which an inlet end of each of the plurality of reactor tubes may be fluidly coupled to one of the heating tubes, and an outlet end of each of the plurality of reactor tubes may be fluidly coupled to one of the condenser tubes of the condenser or to one of the separation chambers of the multi-chamber separator.

In a thirty-second aspect of the present disclosure, a method for evaluating a plurality of catalysts in parallel may include preheating at least one feed composition in a preheating unit comprising a plurality of heating tubes in parallel to produce at least one heated feed composition and contacting the at least one heated feed composition with a catalyst in at least one reactor tube of a reactor unit to produce at least one reactor effluent. The reactor unit may include a plurality of reactor tubes disposed within a reactor shell and an outer heating element disposed about the reactor shell. An inlet end of at least one of the reactor tubes may be fluidly coupled to at least one of the heating tubes of the preheating unit. The reactor unit may have any of the features of the reactor units previously described in this disclosure. The method may further include separating the at least one reactor effluent in a separating chamber of a multi-chamber separator to produce at least one liquid effluent and at least one vapor effluent. The multi-chamber separator may have a plurality of separation chambers, where at least one of the separation chambers may be fluidly coupled to at least one of the reactor tubes.

A thirty-third aspect of the present disclosure may include the thirty-second aspect, comprising condensing at least a portion of the at least one reactor effluent in a condenser downstream of the reactor unit and passing the condensed reactor effluent to the separating chamber of the multi-chamber separator.

A thirty-fourth aspect of the present disclosure may include either one of the thirty-second or thirty-third aspects, further comprising passing the liquid effluent to a liquid collection system.

A thirty-fifth aspect of the present disclosure may include the thirty-fourth aspect, further comprising analyzing a composition of the liquid effluent passed to the liquid collection system.

A thirty-sixth aspect of the present disclosure may include any one of the thirty-second through thirty-fifth aspects, further comprising passing the vapor effluent to a vapor collection unit.

A thirty-seventh aspect of the present disclosure may include any one of the thirty-second through thirty-sixth aspects, comprising passing the heated feed composition to an inlet of each of a plurality of reactor tubes of the reactor unit.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A reactor system for conducting multiple continuous reactions in parallel, the reactor system comprising:
   a preheating unit comprising an outer preheater shell and a plurality of heating tubes disposed within the preheating shell and arranged in parallel;
   a reactor unit downstream of the preheating unit, the reactor unit comprising a plurality of reactor tubes disposed within a reactor shell, an outer heating element disposed about the reactor shell, and a central reactor tube disposed within the reactor shell and concentric with the reactor shell, where:
      an inlet end of at least one of the reactor tubes is fluidly coupled to at least one of the heating tubes of the preheating unit; and
      the reactor tubes are arranged in an annular pattern between the central tube and the reactor shell; and
   a multi-chamber separator downstream of the reactor unit, the multi-chamber separator having a plurality of separation chambers, where at least one of the separation chambers is fluidly coupled to at least one of the reactor tubes.

2. The reactor system of claim 1, further comprising a feed system comprising a plurality of feed vessels and a plurality of feed pumps, where each of the plurality of feed vessels is fluidly coupled to one of the plurality of heating tubes and each of the plurality of feed pumps is operable to transport a feed composition from one of the plurality of feed vessels to the associated heating tube.

3. The reactor system of claim 1, where one or more of the reactor tubes comprises a catalyst.

4. The reactor system of claim 1, where one or more of the reactor tubes does not contain a catalyst and is operable to conduct a thermal conversion process.

5. The reactor system of claim 1, in which the reactor unit comprises the plurality of reactor tubes arranged in an annular pattern within the reactor shell.

6. The reactor system of claim 1, in which the reactor shell comprises a hollow cylindrical tube and each of the reactor tubes comprises a cylindrical tube disposed within and surrounded by the reactor shell, each of the reactor tubes having an outer diameter less than an inner diameter of the reactor shell.

7. The reactor system of claim 6, in which the reactor unit comprises void spaces between the reactor tubes and within the reactor shell and a heat transfer material disposed in the void spaces.

8. The reactor system of claim 1, in which the central tube comprises a reactor tube having an inlet fluidly coupled to one of the plurality of heating tubes or an outlet of one of the other reactor tubes.

9. The reactor system of claim 1, in which the reactor unit comprises a central heating element disposed within the central tube.

10. The reactor system of claim 1, further comprising a condenser unit disposed between the reactor unit and the multi-chamber separator, the condenser comprising a plurality of condenser tubes, where at least one of the plurality of condenser tubes is fluidly coupled to at least one of the reactor tubes and to at least one of the separation chambers of the multi-chamber separator.

11. The reactor system of claim 1, in which an inlet end of at least one of the reactor tubes is fluidly coupled to an outlet of at least one of the other reactor tubes.

12. The reactor system of claim 1, in which the plurality of reactor tubes are fluidly coupled in series.

13. The reactor system of claim 1, in which an outlet of at least one of the reactor tubes is fluidly coupled to an inlet of one of the other reactor tubes and to one of the separation chambers of the multi-chamber separation unit or one of a plurality of condenser tubes of a condenser unit.

14. The reactor system of claim 1, in which an inlet end of each of the plurality of reactor tubes is fluidly coupled to one of the heating tubes and an outlet end of each of the plurality of reactor tubes is fluidly coupled to one of a plurality of condenser tubes of a condenser or to one of the separation chambers of the multi-chamber separator.

15. A method for evaluating a plurality of catalysts in parallel, the method comprising:
   introducing at least one feed composition to the reactor system of claim 1;
   preheating the at least one feed composition in the preheating unit comprising the plurality of heating tubes in parallel to produce at least one heated feed composition;
   contacting the at least one heated feed composition with a catalyst in at least one reactor tube of the reactor unit to produce at least one reactor effluent; and
   separating the at least one reactor effluent in the at least one of the separation chambers of the multi-chamber separator to produce at least one liquid effluent and at least one vapor effluent.

16. The method of claim 15, comprising condensing at least a portion of the at least one reactor effluent in a condenser downstream of the reactor unit to produce a condensed reactor effluent and passing the condensed reactor effluent to the at least one of the separation chambers of the multi-chamber separator.

17. The method of claim 15, further comprising passing the at least one liquid effluent to a liquid collection system and analyzing a composition of the at least one liquid effluent passed to the liquid collection system.

18. The method of claim 15, further comprising passing the at least one vapor effluent to a vapor collection unit.

19. The method of claim 15, comprising passing the at least one heated feed composition to an inlet of each of the plurality of reactor tubes of the reactor unit.

* * * * *